United States Patent
Hwang et al.

(10) Patent No.: US 11,350,398 B2
(45) Date of Patent: May 31, 2022

(54) METHOD AND APPARATUS FOR TRANSMITTING AND RECEIVING DOWNLINK DATA CHANNEL

(71) Applicant: LG Electronics Inc., Seoul (KR)

(72) Inventors: Daesung Hwang, Seoul (KR); Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 16/640,301

(22) PCT Filed: Oct. 24, 2019

(86) PCT No.: PCT/KR2019/014050
§ 371 (c)(1),
(2) Date: Feb. 19, 2020

(87) PCT Pub. No.: WO2020/085813
PCT Pub. Date: Apr. 30, 2020

(65) Prior Publication Data
US 2020/0296697 A1 Sep. 17, 2020

Related U.S. Application Data

(60) Provisional application No. 62/758,500, filed on Nov. 9, 2018.

(30) Foreign Application Priority Data

Oct. 26, 2018 (KR) .................. 10-2018-0129327
Dec. 17, 2018 (KR) .................. 10-2018-0163283

(51) Int. Cl.
*H04W 4/00* (2018.01)
*H04W 72/04* (2009.01)
*H04W 74/08* (2009.01)

(52) U.S. Cl.
CPC ..... *H04W 72/042* (2013.01); *H04W 74/0833* (2013.01)

(58) Field of Classification Search
CPC ........... H04W 72/042; H04W 74/0833; H04W 72/04; H04W 48/16
See application file for complete search history.

(56) References Cited

U.S. PATENT DOCUMENTS 10,512,070 B2 * 12/2019 Shao ................... H04W 72/04
2014/0105162 A1 * 4/2014 Li ........................ H04L 5/0091
370/329
(Continued)

FOREIGN PATENT DOCUMENTS

KR  20150087795  7/2015
KR  20160091491  8/2016
(Continued)

OTHER PUBLICATIONS

AT&T, "Remaining details on PDSCH time domain resource allocation", R1-1809060, 3GPP TSG RAN WG1 Meeting #94, Gothenburg, Sweden, Aug. 20-24, 2018, 3 pages.
(Continued)

*Primary Examiner* — Abdelnabi O Musa
(74) *Attorney, Agent, or Firm* — Fish & Richardson P.C.

(57) ABSTRACT

A method of receiving a physical downlink shared channel (PDSCH) by a user equipment (UE) in a wireless communication system includes receiving first information about a PDSCH time-domain resource assignment table including a plurality of candidate PDSCH time-domain resource assignment information, receiving second information about a minimum offset value for an interval between a slot in which a physical downlink control channel (PDCCH) is received and a slot to which a PDSCH is allocated, and receiving the PDSCH based on candidate PDSCH time-domain resource assignment information including an offset value equal to or
(Continued)

larger than the minimum offset value among the candidate PDSCH time-domain resource assignment information. The PDSCH is received based on one of the candidate PDSCH time-domain resource assignment information irrespective of the minimum offset value, based on a PDCCH for scheduling the PDSCH, being related to system information (SI), a random access response (RAR), or paging.

9 Claims, 19 Drawing Sheets

(56) References Cited

U.S. PATENT DOCUMENTS

| | | | |
|---|---|---|---|
| 2015/0131564 A1* | 5/2015 | Seo | H04L 5/00 370/329 |
| 2019/0149365 A1* | 5/2019 | Chatterjee | H04L 5/0094 370/329 |
| 2019/0150183 A1* | 5/2019 | Aiba | H04W 72/0446 370/336 |
| 2019/0297629 A1* | 9/2019 | Lin | H04W 72/0446 |
| 2021/0120572 A1* | 4/2021 | Chen | H04W 72/0493 |

FOREIGN PATENT DOCUMENTS

| | | |
|---|---|---|
| WO | WO2013/065990 | 5/2013 |
| WO | WO2013/092364 | 6/2014 |

OTHER PUBLICATIONS

LG Electronics, "Discussion on UE adaptation to UE power consumption characteristics", R1-1812587, 3GPP TSG RAN WG1 Meeting #95, Spokane, USA, Nov. 12-16, 2018, 7 pages.

MediaTek Inc., "Summary of Offline on Cross-Slot Scheduling", R1-1905819, 3GPP TSG RAN WG1 Meeting #96-Bis, Xi'an, China, Apr. 8-12, 2019, 17 pages.

* cited by examiner

FIG. 1
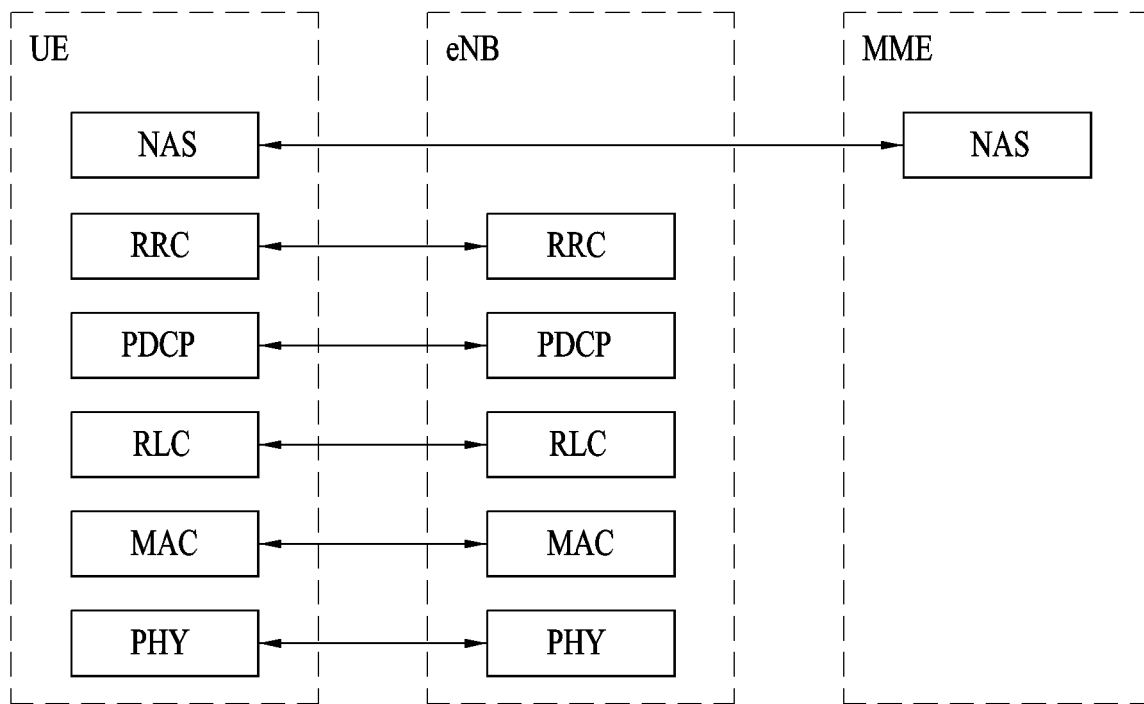
(A) CONTROL-PLANE PROTOCOL STACK
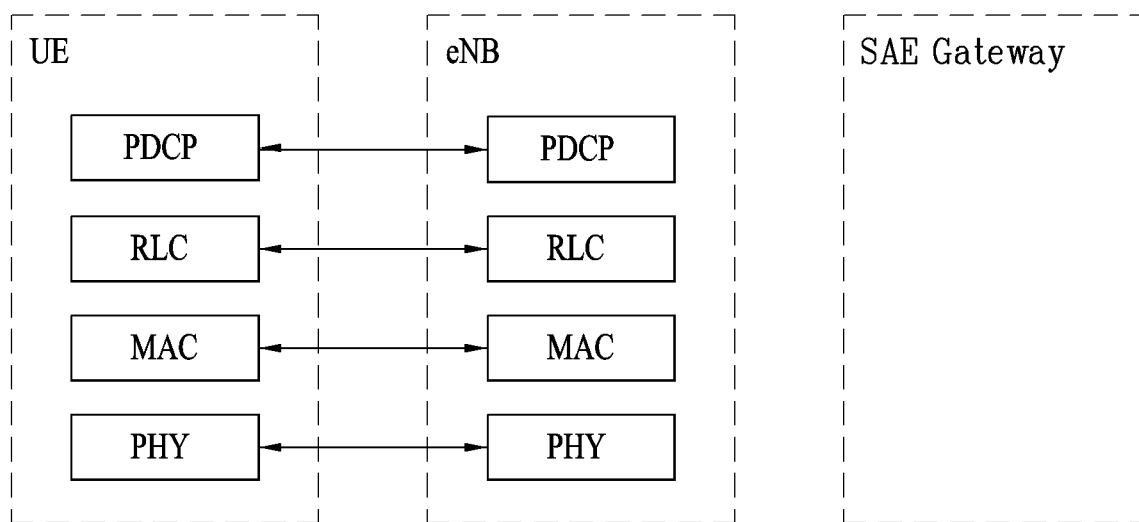
(B) USER-PLANE PROTOCOL STACK

METHOD AND APPARATUS FOR TRANSMITTING AND RECEIVING DOWNLINK DATA CHANNEL

CROSS-REFERENCE TO RELATED APPLICATIONS

This application is a National Stage application under 35 U.S.C. § 371 of International Application No. PCT/KR2019/014050, filed on Oct. 24, 2019, which claims the benefit of Korean Application No. 10-2018-0163283, filed on Dec. 17, 2018, U.S. Provisional Application No. 62/758,500, filed on Nov. 9, 2018, and Korean Application No. 10-2018-0129327, filed on Oct. 26, 2018. The disclosures of the prior applications are incorporated by reference in their entirety.

TECHNICAL FIELD

The present disclosure relates to a method and apparatus for transmitting and receiving a downlink data channel, and more particularly, to a method and apparatus for buffering a downlink signal to save power of a user equipment (UE).

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving a downlink data channel.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of receiving a physical downlink shared channel (PDSCH) by a user equipment (UE) in a wireless communication system may include receiving first information related to a PDSCH time-domain resource assignment table including a plurality of pieces of candidate PDSCH time-domain resource assignment information for PDSCH scheduling, receiving second information related to a minimum offset value for an interval between a slot in which a physical downlink control channel (PDCCH) is received and a slot to which a PDSCH is allocated, and receiving the PDSCH based on candidate PDSCH time-domain resource assignment information including an offset value equal to or larger than the minimum offset value among the plurality of pieces of candidate PDSCH time-domain resource assignment information. The PDSCH may be received based on one of the plurality of candidate PDSCH time-domain resource assignment information irrespective of the minimum offset value, based on a PDCCH for scheduling the PDSCH, being related to system information (SI), a random access response (RAR), or paging.

The PDSCH may be receivable based on candidate PDSCH time-domain resource assignment information including an offset value less than the minimum offset value, based on the PDCCH being related to the SI, the RAR, or the paging.

Further, the second information may be received in downlink control information (DCI).

No other downlink signal than the PDSCH may be received from a first slot in which the PDCCH is received to a second slot based on the minimum offset value.

Further, the UE may be communicable with at least one of another UE, a network, a base station (BS), or an autonomous driving vehicle.

According to the present disclosure, an apparatus for receiving a PDSCH in a wireless communication system may include at least one processor and at least one memory operatively coupled to the at least one processor, and storing instructions which, when executed, cause the at least one processor to perform a predetermined operation. The predetermined operation may include receiving first information related to a PDSCH time-domain resource assignment table including a plurality of pieces of candidate PDSCH time-domain resource assignment information for PDSCH scheduling, receiving second information related to a minimum offset value for an interval between a slot in which a PDCCH is received and a slot to which a PDSCH is allocated, and receiving the PDSCH based on candidate PDSCH time-domain resource assignment information including an offset value equal to or larger than the minimum offset value among the plurality of pieces of candidate PDSCH time-domain resource assignment information. The PDSCH may be received based on one of the plurality of candidate PDSCH time-domain resource assignment information irrespective of the minimum offset value, based on a PDCCH for scheduling the PDSCH, being related to SI, an RSR, or paging.

The PDSCH may be receivable based on candidate PDSCH time-domain resource assignment information including an offset value less than the minimum offset value, based on the PDCCH being related to the SI, the RAR, or the paging.

The second information may be received in DCI.

No other downlink signal than the PDSCH may be received from a first slot in which the PDCCH is received to a second slot based on the minimum offset value.

The apparatus may be communicable with at least one of a UE, a network, a base station (BS), or an autonomous driving vehicle.

According to the present disclosure, a UE for receiving a PDSCH in a wireless communication system may include at least one transceiver, at least one processor, and at least one memory operatively coupled to the at least one processor, and storing instructions which, when executed, cause the at least one processor to perform a predetermined operation. The predetermined operation may include receiving first information related to a PDSCH time-domain resource assignment table including a plurality of pieces of candidate PDSCH time-domain resource assignment information for PDSCH scheduling, receiving, through the at least one transceiver, second information related to a minimum offset value for an interval between a slot in which a physical downlink control channel (PDCCH) is received and a slot to which a PDSCH is allocated, and receiving, through the at least one transceiver, the PDSCH based on candidate PDSCH time-domain resource assignment information including an offset value equal to or larger than the minimum offset value among the plurality of pieces of candidate PDSCH time-domain resource assignment information. The PDSCH may be received based on one of the plurality of candidate PDSCH time-domain resource assignment information irrespective of the minimum offset value, based on a PDCCH for scheduling the PDSCH, being related to SI, an RAR, or paging.

Advantageous Effects

According to the present disclosure, power consumption of a user equipment (UE) may be optimized during transmission and reception of a downlink signal.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 1 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

BEST MODE

Figure 2:
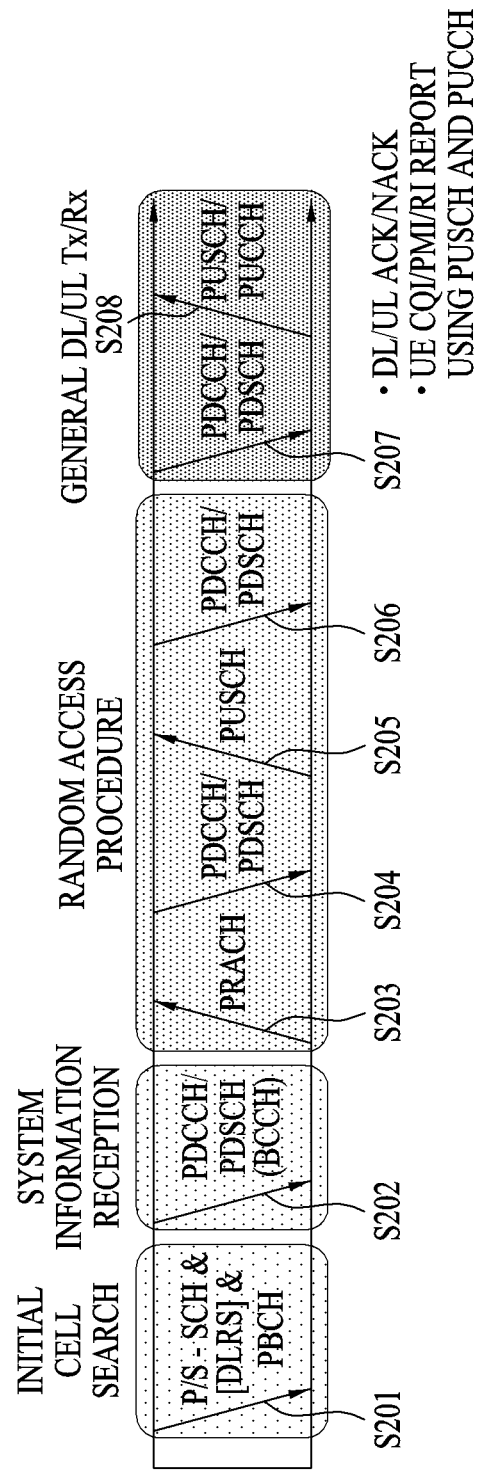
FIG. 2 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/

PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

Now, 5G communication including an NR system will be described.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional tasks and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both tasks and entertainment. The cloud storage is a special use case which accelerates growth of uplink data transmission rate. 5G is also used for a remote task of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential for smart grid control, industrial automation, robotics, and drone control and adjustment.

Next, a plurality of use cases in the 5G communication system including the NR system will be described in more detail.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

An NR system considers a method using an ultra-high frequency band, i.e., a millimeter frequency band of 6 GHz or above, to transmit data to multiple users using a wide frequency band while maintaining a high transmission rate. In 3GPP, this is used by the name of NR and, in the present disclosure, this will be hereinafter referred to as the NR system.

Further, the NR system adopts OFDM or a similar transmission scheme. The NR system may use different OFDM parameters from those in LTE. Alternatively, the NR system may have a larger system bandwidth (e.g., 100 MHz), although it is based on the legacy LTE/LTE-A numerology. Alternatively, one cell may support a plurality of numerologies in the NR system. That is, UEs operating with different numerologies may co-exist within one cell.

Figure 3:
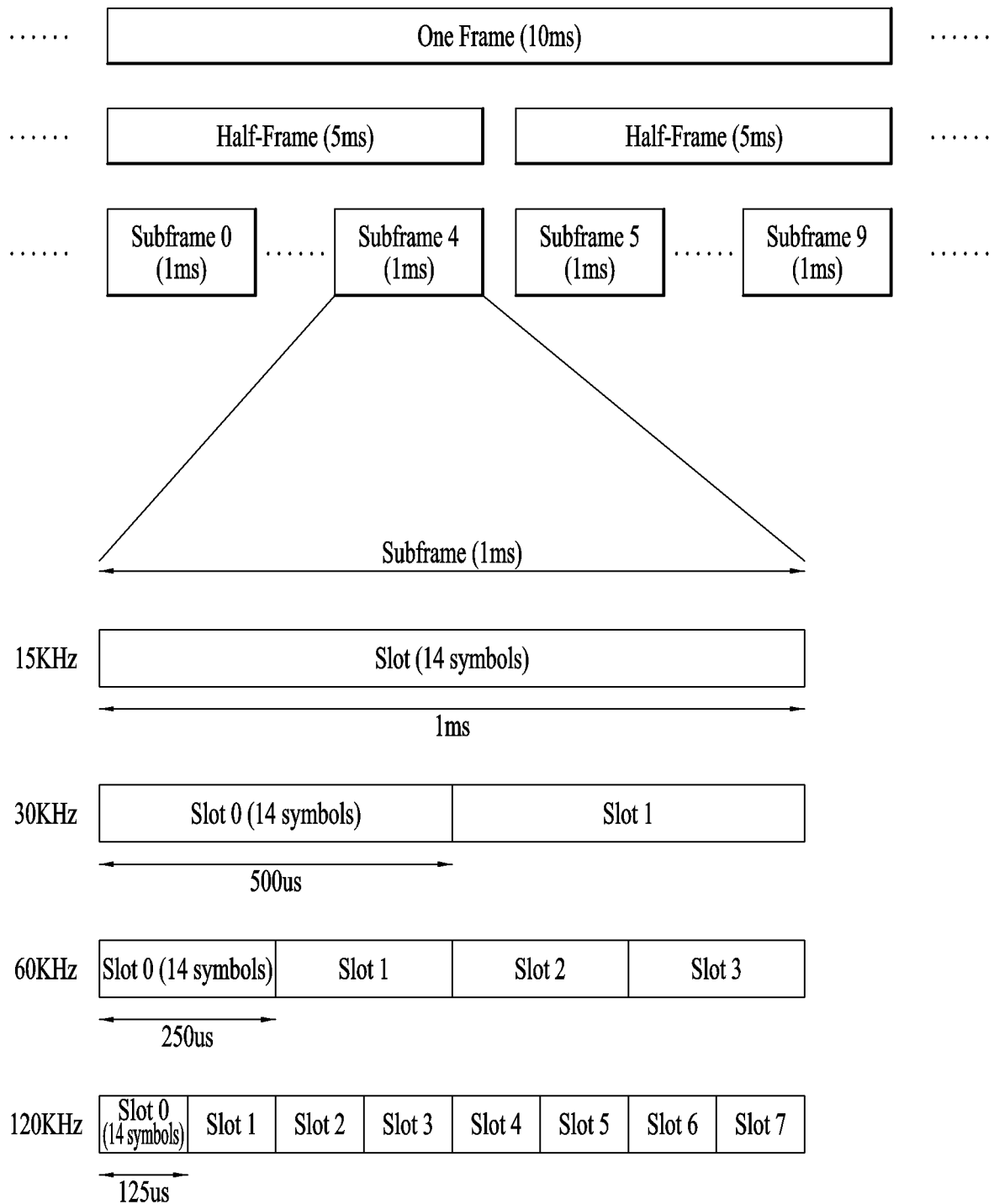
FIGS. 3 to 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{subframe,u}_{slot}$: Number of slots in a subframe
* $N^{slot}_{symb}$: Number of symbols in a slot
* $N^{frame,u}_{slot}$: Number of slots in a frame

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
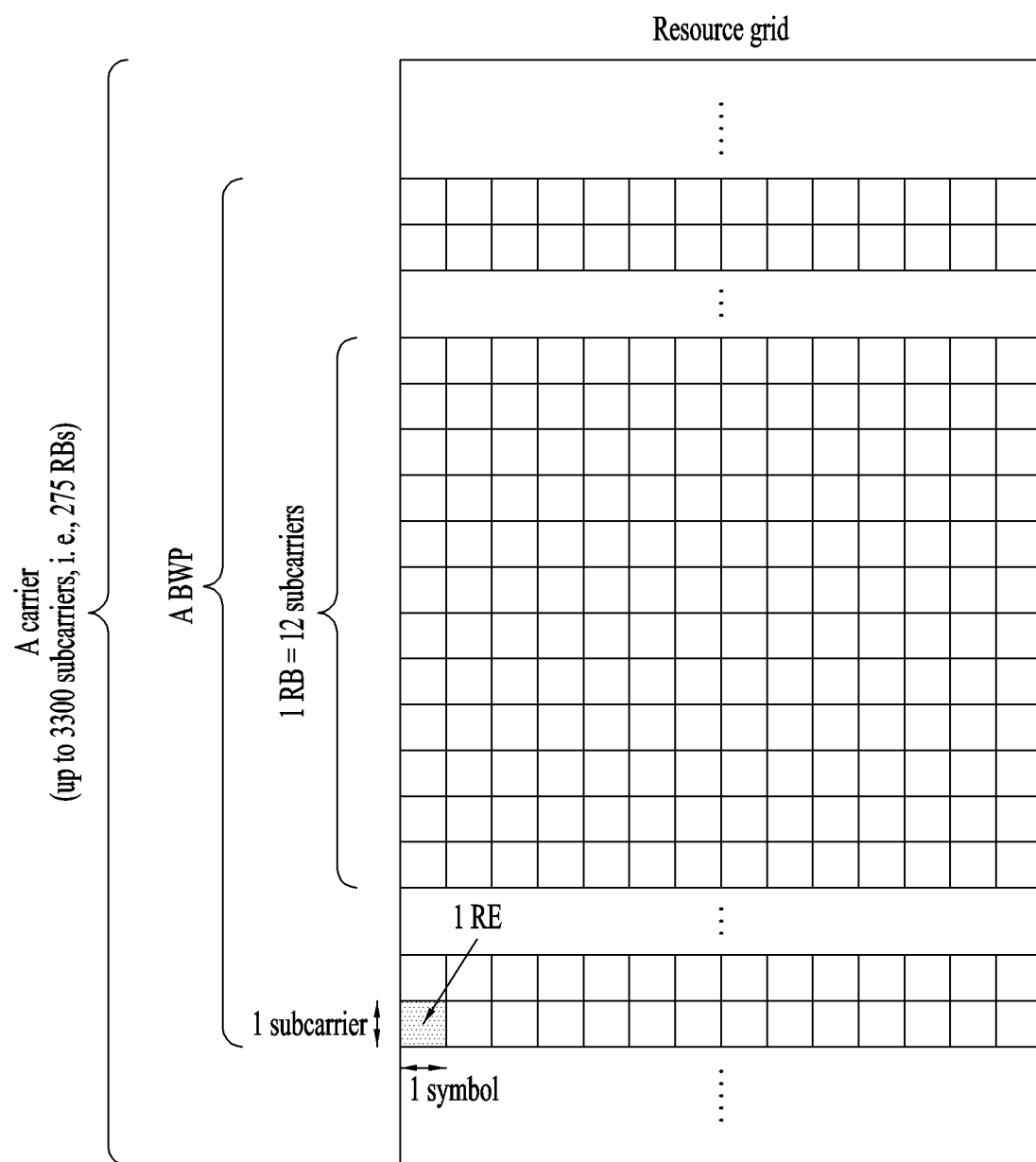

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
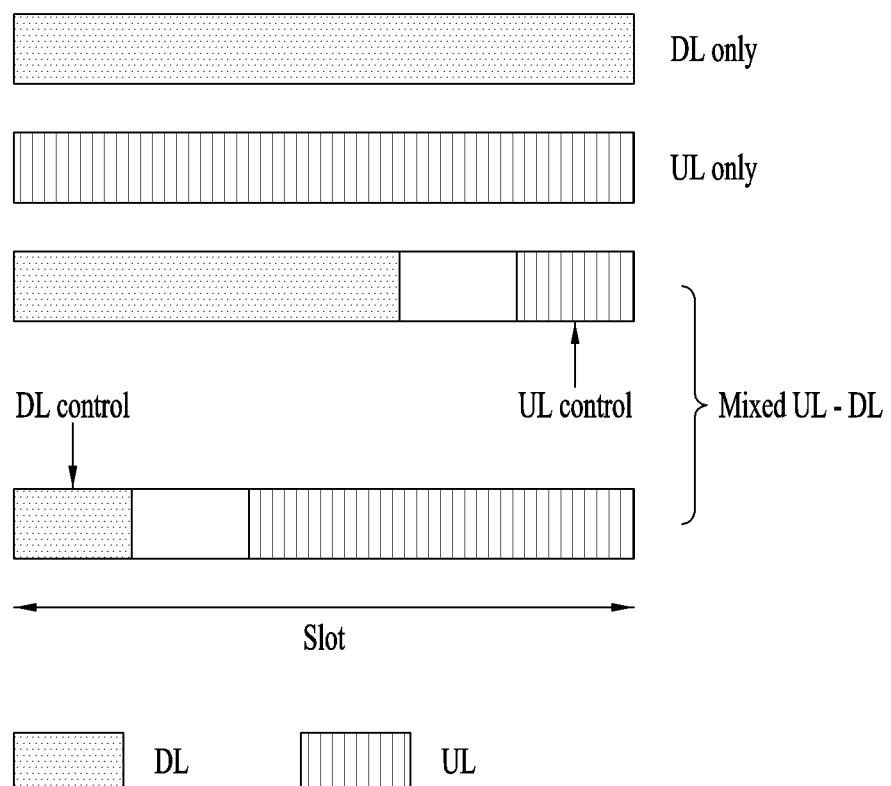

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 6:
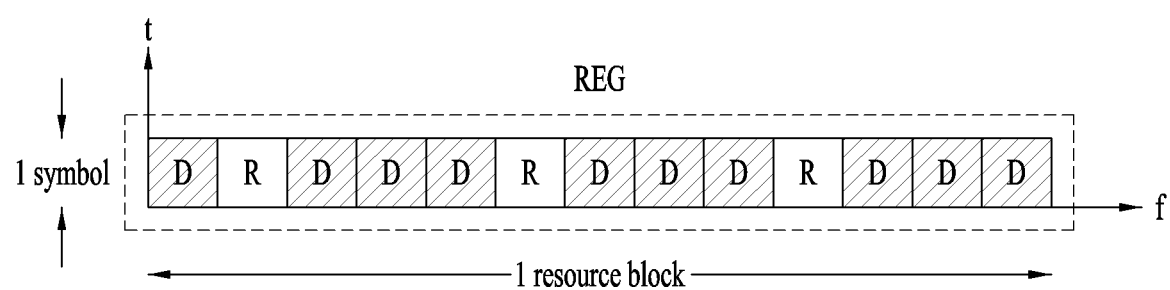
FIGS. 6 to 8 are diagrams illustrating a physical downlink control channel (PDCCH) in the NR system.

FIG. 6 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figure 7:
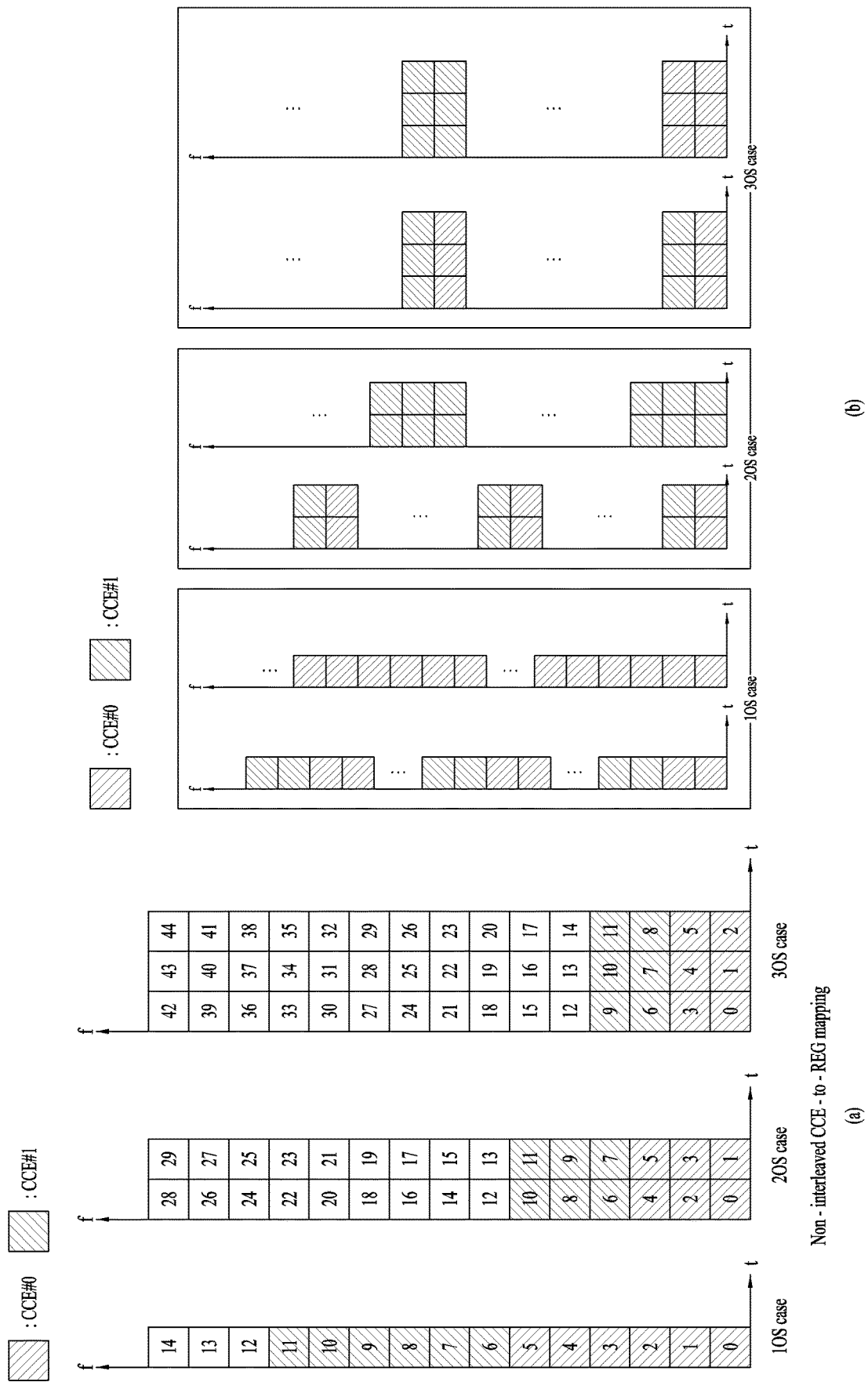

CCE-to-REG mapping for the CORESET may be an interleaved type or a non-interleaved type. FIG. 7(a) is an exemplary view illustrating non-interleaved CCE-REG mapping, and FIG. 7(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 8:
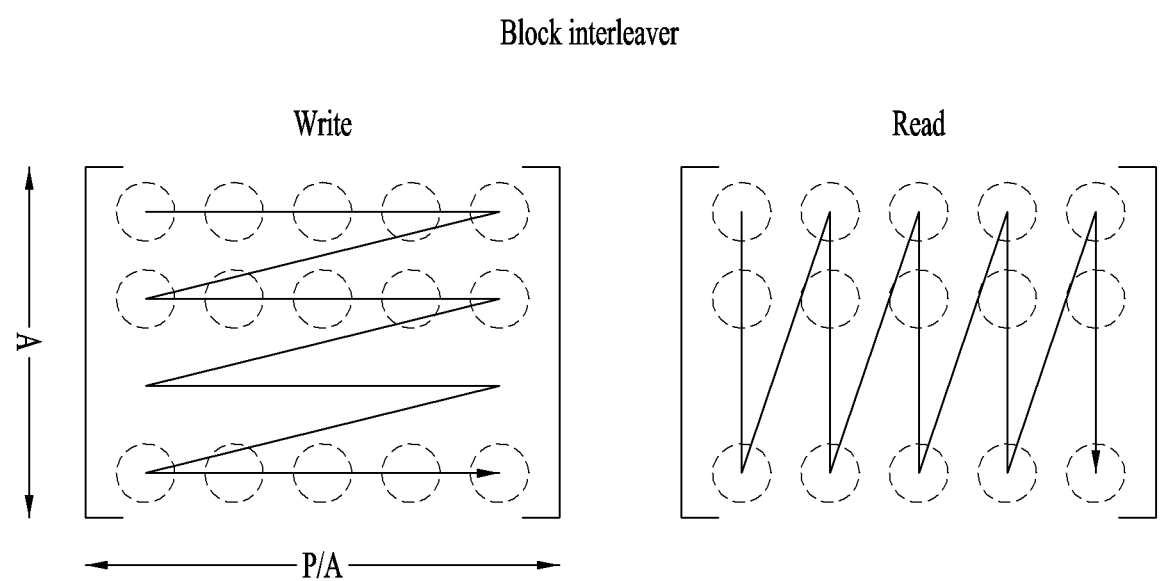
Figure 12:
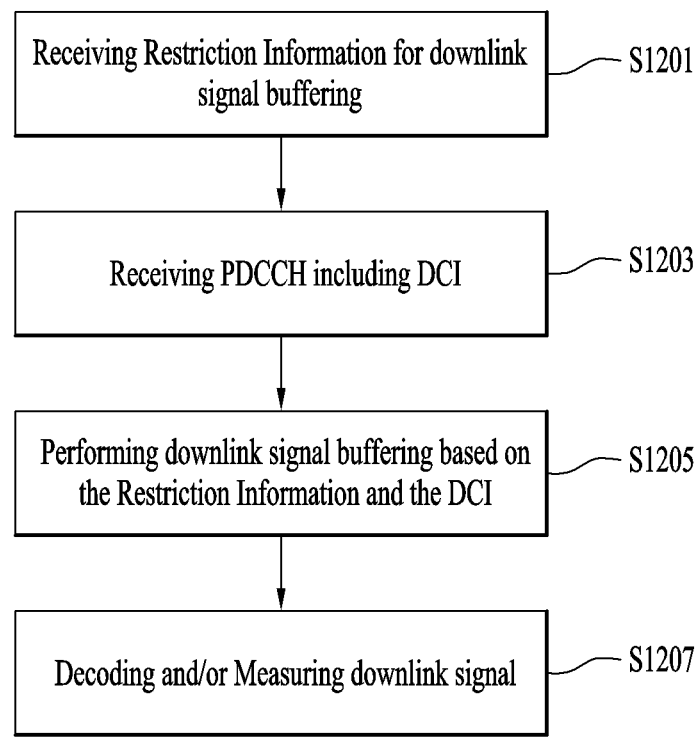
FIGS. 12, 13 and 14 are diagrams illustrating exemplary operations of a UE, a base station (BS), and a network according to the present disclosure.

FIG. 8 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 12. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

[Table 3] lists exemplary features of the respective search space types.

TABLE 3

| Type | Search Space | RNTI | Use Case |
|---|---|---|---|
| Type0-PDCCH | Common | SI-RNTI on a primary cell | SIB Decoding |

TABLE 3-continued

| Type | Search Space | RNTI | Use Case |
|---|---|---|---|
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

[Table 4] lists exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

Figure 9:
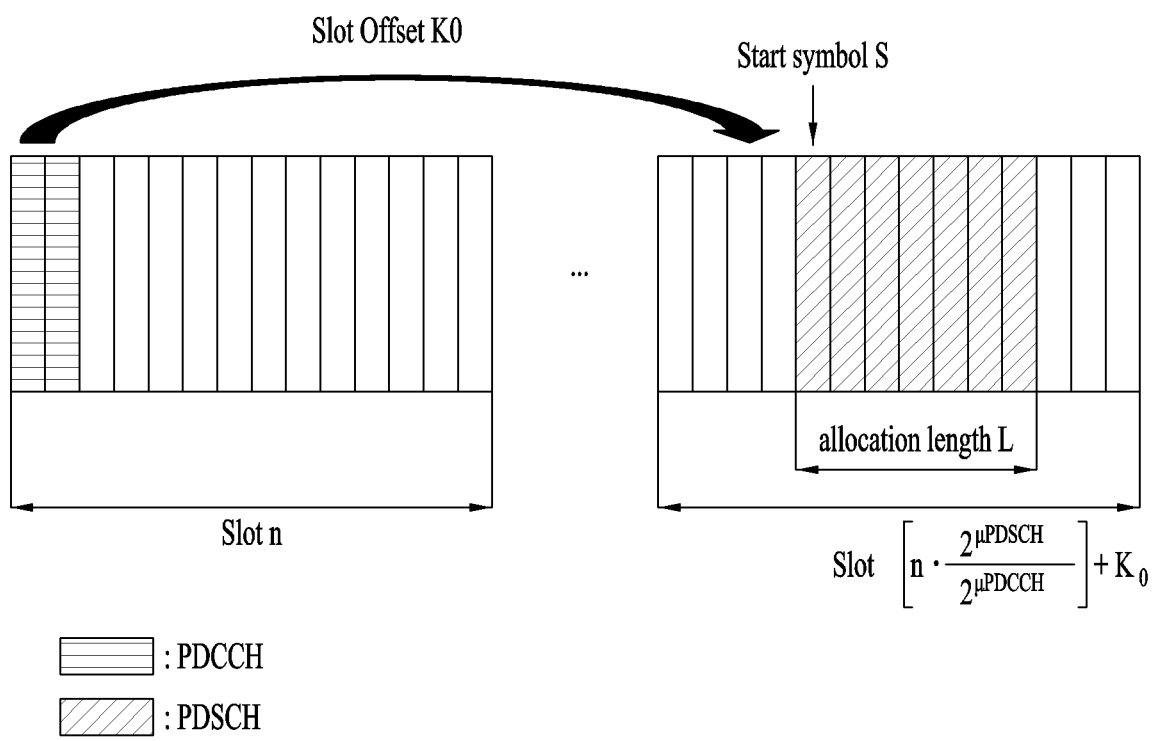
FIG. 9 is a diagram illustrating a method of allocating resources to a physical downlink shared channel (PDSCH).

Physical Downlink Shared Channel (PDSCH) Resource Allocation (1) PDSCH Resource Allocation in Time Domain FIG. 9 is a view illustrating a method of allocating PDSCH time resources in an NR system.

Referring to FIG. 9, a UE may be configured with a PDSCH time-domain resource assignment table by a higher-layer parameter, 'pdsch-TimeDomainAllocationList'. Subsequently, the UE may receive DCI including a 'Time-domain resource assignment' field and obtain the value 'm' of the 'Time-domain resource assignment' field. Further, the UE may obtain a slot offset K0 and a start and length indicator value (SLIV) which correspond to a row index 'm+1' in the configured PDSCH time-domain resource assignment table, and derive a PDSCH start symbol S and a PDSCH allocation length L based on the SLIV. Instead of the SLIV, the PDSCH start symbol S and the PDSCH allocation length L may be obtained directly from the row index 'm+1' in the above-described PDSCH time-domain resource assignment table.

Specifically, referring to FIG. 9, when the UE receives DCI in slot #n, a PDSCH may be allocated during a time period L from symbol #S in a slot corresponding to the 'Time-domain resource assignment' field. The uPDCCH and uPDSCH may refer to the SCSs of the PDCCH and the PDSCH, respectively. For example, given K0=1, S=0, and L=5 for equal uPDCCH and uPDSCH, the PDSCH may be allocated in symbol #0 to symbol #4 of slot #(n+1).

When needed, the PDSCH time-domain resource assignment table may be one of default PDSCH time-domain resource assignment tables A, B and C, instead of the table configured by the higher-layer parameter 'pdsch-TimeDomainAllocationList'.

[Table 5] is the default PDSCH time-domain resource assignment table A in a normal CP case, [Table 6] is the default PDSCH time-domain resource assignment table A in an extended CP case, [Table 7] is the default PDSCH time-domain resource assignment table B, and [Table 8] is the default PDSCH time-domain resource assignment table C.

TABLE 5

| Row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 6

| Row index | dmrs-TypeA-Position | PDSCH mapping type | $K_0$ | S | L |
|---|---|---|---|---|---|
| 1 | 2 | Type A | 0 | 2 | 6 |
| | 3 | Type A | 0 | 3 | 5 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 6 | 4 |
| | 3 | Type B | 0 | 8 | 2 |
| 7 | 2 | Type B | 0 | 4 | 4 |
| | 3 | Type B | 0 | 6 | 4 |

TABLE 6-continued

| Row index | dmrs-TypeA-Position | PDSCH mapping type | $K_0$ | S | L |
|---|---|---|---|---|---|
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

TABLE 7

| Row index | dmrs-TypeA-Position | PDSCH mapping type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 | 2, 3 | Type B | 1 | 2 | 4 |
| 16 |  | Reserved |  |  |  |

(Note 1):
If the PDSCH was scheduled with SI-RNTI in PDCCH Type0 common search space, the UE may assume that this PDSCH resource allocation is not applied

TABLE 8

| Row index | dmrs-TypeA-Position | PDSCH mapping type | $K_0$ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |  | Reserved |  |  |  |
| 7 |  | Reserved |  |  |  |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

(Note 1):
The UE may assume that this PDSCH resource allocation is not used, if the PDSCH was scheduled with SI-RNTI in PDCCH Type0 common search space (2) PDSCH Resource Allocation in Frequency Domain Two resource allocation schemes, Type 0 and Type 1 are defined for a PDSCH/PUSCH. Upon receipt of scheduling information in DCI format 0_0/1_0, the UE assumes that Type 0 is used.

When a higher-layer parameter 'resourceAllocation' is set to 'dynamicswitch' and thus a part of a Frequency domain resource assignment field of DCI is set to indicate a resource allocation type, the UE uses Type 0 or Type 1 according to the DCI field. Otherwise, the UE uses Type 0 or Type 1 according to the value of the higher-layer parameter 'resourceAllocation'.

When Type 0 is used, the resource assignment field of the DCI includes bitmap information. The bitmap information is about RGBs allocated to the UE. An RBG is a set of contiguous RBs.

When Type 1 is used, the resource assignment field of the DCI includes a resource indication value (RIV). The start RB and length of allocated contiguous RBs may be derived from the RIV.

Bandwidth Part (BWP)

The NR system may support up to 400 MHz per carrier. If a UE operating in such a wideband carrier always keeps a radio frequency (RF) module on for the whole carrier, the battery consumption of the UE may increase. Further, considering multiple use cases (e.g., eMBB, URLLC, mMTC, V2X, etc.) operating in one wideband carrier, different numerologies (e.g., SCSs) may be supported for different frequency bands of the carrier. Further, each UE may have a different capability regarding a maximum bandwidth. In this regard, the eNB may indicate the UE to operate only in a partial bandwidth, not the total bandwidth of the wideband carrier. The partial bandwidth is referred to as a bandwidth part (BWP). A BWP in the frequency domain is a subset of contiguous common RBs defined for numerology $\mu_i$ in BWP i of the carrier, and one numerology (e.g., SCS, CP length, and/or slot/mini-slot duration) may be configured for the BWP.

The eNB may configure one or more BWPs in one carrier configured for the UE. If UEs are concentrated in a specific BWP, some of the UEs may be switched to another BWP, for load balancing. For frequency-domain inter-cell interference cancellation between adjacent cells, BWPs at both ends of the total bandwidth of a cell except for some center spectrum may be configured in the same slot. That is, the eNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

CSI-Related Operation

In the NR system, a CSI-RS is used for time and/or frequency tracking, CSI computation, reference signal received power (RSRP) computation, and mobility. The CSI computation is related to CSI acquisition, and the RSRP computation is related to beam management (BM).

Figure 10:
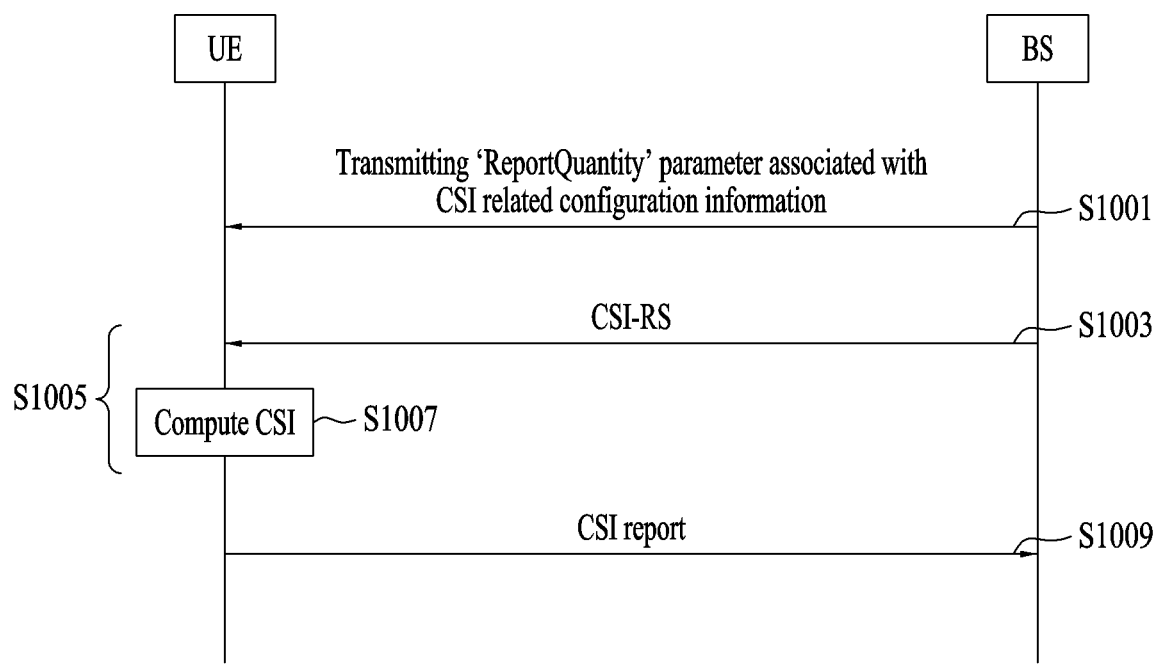
FIG. 10 is a diagram illustrating a signal flow for channel state information (CSI) reporting.

FIG. 10 is a diagram illustrating a signal flow for an exemplary CSI-related process.

To serve one of the above CSI-RS usages, a UE receives CSI-related configuration information from a BS by RRC signaling (S1001).

The CSI-related configuration information may include at least one of CSI-interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-synchronization signal block (CSI-SSB) resource set. That is, the CSI resource configuration-related information may include a CSI-RS resource set list which may in turn include at least one of an NZP CSI-resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating a CSI-RS usage (e.g., a BM-related parameter 'repetition' or a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S1005). The CSI measurement may include (1) CSI-RS reception of the UE (S1003) and (2) computation of CSI in the received CSI-RS (S1007). Mapping of the CSI-RS to REs of CSI-RS resources in the time and frequency domains is configured by an RRC parameter, CSI-RS-ResourceMapping.

The UE reports the measured CSI to the BS (S1009).

1. CSI Measurement

The NR system supports more flexible, more dynamic CSI measurement and reporting. The CSI measurement may include CSI-RS reception, and CSI acquisition by measuring a received CSI-RS.

Channel measurement (CM) and interference measurement (IM) are supported as time-domain behaviors of CSI measurement and reporting.

In NR, a CSI-IM-based IM resource (IMR) is designed in a similar manner to a CSI-IM in LTE, and configured independently of zero power (ZP) CSI-RS resources used for PDSCH rate-matching.

The BS transmits an NZP CSI-RS on each port of a configured NZP CSI-RS-based MZ to the UE.

In the absence of any PMI and RI feedback for a channel, a plurality of resources are configured from a set, and the BS or network indicates a subset of NZP CSI-RS resources for CM and/or IM by DCI.

Resource setting and resource setting configuration will be described in greater detail.

1. 1. Resource Setting

Each CSI resource setting 'CSI-ResourceConfig' (given by an RRC parameter, csi-RS-ResourceSetList) includes a configuration for S≥1 CSI resource sets. The CSI resource setting corresponds to CSI-RS-resourcesetlist. Herein, S represents the number of configured CSI-RS resource sets. The configuration for the S≥1 CSI resource sets includes each CSI resource set including CSI-RS resources (for NZP CSI-RSs or CSI-IMs), and SSB resources used for RSRP computation.

Each CSI resource setting is located in a DL BWP identified by an RRC parameter, bwp-id. All CSI resource settings linked to a CSI reporting setting has the same DL BWP.

A time-domain behavior of a CSI-RS resource in the CSI resource setting included in the CSI-ResourceConfig IE may be indicated by an RRC parameter, resourceType, and may be set to periodic, aperiodic, or semi-persistent.

One or more CSI resource settings for CM and IM are configured by RRC signaling. A channel measurement resource (CMS) may be an NZP CSI-RS for CSI acquisition, and an IMR may be a CSI-IM or an NZP CSI-RS for IM. The CSI-IM (or a ZP CSI-RS for IM) is used mainly to measure inter-cell interference. The NZP CSI-RS for IM is used mainly to measure intra-cell interference from multiple users.

The UE may assume that CSI-RS resource(s) for CM and CSI-IM/NZP CSI-RS resource(s) for IM, configured for one CSI report, are of 'QCL-TypeD' on a resource basis.

1.2. Resource Setting Configuration

A resource setting may refer to a resource set list. One reporting setting may be linked to up to three resource settings.

When one resource setting is configured, a resource setting (given by an RRC parameter, resourcesForChannelMeasurement) is for CM, for RSRP measurement.

When two resource settings are configured, a first resource setting (given by the RRC parameter, resourcesForChannelMeasurement) is for CM, and a second resource setting (given by csi-IM-ResourcesForInterference or nzp-CSI-RS-ResourcesForInterference) is for CSI-IM-based IM or NZP CSI-RS-based IM.

When three resource settings are configured, a first resource setting (given by the RRC parameter, resourcesForChannelMeasurement) is for CM, a second resource setting (given by csi-IM-ResourcesForInterference) is for CSI-IM-based IM, and a third resource setting (given by nzp-CSI-RS-ResourcesForInterference) is for NZP CSI-RS-based IM.

When one resource setting (given by an RRC parameter, resourcesForChannelMeasurement) is configured, the resource setting is for CM, for RSRP measurement.

When two resource settings are configured, the first resource setting (given by resourcesForChannelMeasurement) is for CM, and the second resource setting (given by the RRC parameter, csi-IM-ResourcesForInterference) is for IM performed in a CSI-IM.

1.3. CSI Computation

When IM is performed in a CSI-IM, each CSI-RS resource for CM is associated with a CSI-IM resource on a resource basis according to the order of CSI-RS resources and CSI-IM resources in a corresponding resource set. The number of CSI-RS resources for CM is equal to the number of CSI-IM resources.

For CSI measurement, the UE assumes the following.
Each NZP CSI-RS port configured for IM corresponds to an interference transmission layer.
An energy per resource element (EPRE) ratio is considered for every interference transmission layer of NZP CSI-RS ports for IM.
Another interference signal id-s assumed in RE(s) of an NZP CSI-RS resource for CM, an NZP CSI-RS resource for IM, or a CSI-IM resource for IM.

2. CSI Reporting

For CSI reporting, time and frequency available to the UE are controlled by the BS.

For a CQI, a PMI, a CRI, an SSBRI, an LI, an RI, and an RSRP, the UE receives RRC signaling including N≥1 CSI-ReportConfig reporting settings, M≥1 CSI-ResourceConfig resource settings, and one or two state lists (provided by aperiodicTriggerStateList and semiPersistentOnPUSCH-TriggerStateList). In aperiodicTriggerStateList, each trigger state includes an associated CSI-ReportConfigs list indicating resource set IDs for channels and optionally, interference. In semiPersistentOnPUSCH-TriggerStateList, each trigger state includes one associated CSI-ReportConfig.

That is, in regard to each CSI-RS resource setting, the UE transmits, to the BS, a CSI report indicated by CSI-ReportConfigs associated with a corresponding CSI resource setting. For example, the UE may report at least one of a CQI, a PMI, a CRI, an SSBRI, an LI, an RI, or an RSRP, as indicated by CSI-ReportConfigs associated with the CSI resource setting. However, when CSI-ReportConfigs associated with the CSI resource setting indicates 'none', the UE may not report CSI or RSRP associated with the CSI resource setting. The CSI resource setting may include a resource for a synchronization signal (SS)/physical broadcast channel (PBCH) block.

Discontinuous Reception (DRX) Operation

While the UE performs the above-described/proposed procedures and/or methods, the UE may perform the DRX operation. The UE for which DRX is configured may reduce power consumption by discontinuously receiving a DL signal. DRX may be performed in a radio resource control (RRC) IDLE state, an RRC_INACTIVE state, or an RRC_CONNECTED state. DRX in the RRC_IDLE state and the RRC_INACTIVE state is used to discontinuously receive a paging signal. Hereinafter, DRX performed in the RRC_CONNECTED state will be described (RRC_CONNECTED DRX).

Figure 11:
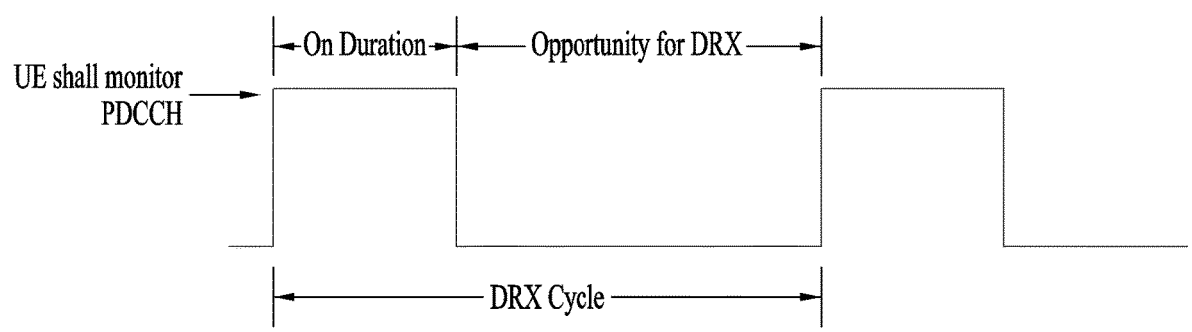
FIG. 11 is a diagram illustrating an embodiment of a discontinuous reception (DRX) operation.

FIG. 11 illustrates a DRX cycle (RRC_CONNECTED state).

Referring to FIG. 11, the DRX cycle includes an On-duration and an opportunity for DRX. The DRX cycle defines a time interval at which the On-duration is cyclically repeated. The On-Duration indicates a time duration that the UE monitors to receive a PDCCH. If DRX is configured, the UE performs PDCCH monitoring during the On-duration. If the PDCCH is successfully detected during PDCCH monitoring, the UE operates an inactivity timer and maintains an awoken state. On the other hand, if there is no PDCCH which has been successfully detected during PDCCH monitoring, the UE enters a sleep state after the On-duration is ended. Therefore, when DRX is configured, the UE may discontinuously perform PDCCH monitoring/reception in the time domain upon performing the above-described/proposed procedures and/or methods. For example, when DRX is configured, a PDCCH reception occasion (e.g., a slot having a PDCCH search space) in the present invention may be discontinuously configured according to DRX configuration. When DRX is not configured, PDCCH monitoring/reception may be continuously performed in the time domain. For example, when DRX is not configured, the PDCCH reception occasion (e.g., the slot having the PDCCH search space) in the present invention may be continuously configured. Meanwhile, PDCCH monitoring may be restricted in a time duration configured as a measurement gap regardless of whether DRX is configured or not.

[Table 9] illustrates a UE procedure related to DRX (RRC_CONNECTED state). Referring to [Table 9], DRX configuration information is received through higher layer (e.g., RRC) signaling. Whether DRX is ON or OFF is controlled by a DRX command of a MAC layer. If DRX is configured, the UE may discontinuously perform PDCCH monitoring upon performing the above-described/proposed procedures and/or methods in the present invention, as illustrated in FIG. 11.

TABLE 9

|  | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

Herein, MAC-CellGroupConfig includes configuration information needed to configure a MAC parameter for a cell group. MAC-CellGroupConfig may also include configuration information regarding DRX. For example, MAC-CellGroupConfig may include information for defining DRX as follows.—Value of drx-OnDurationTimer: defines the length of a starting duration of a DRX cycle.

Value of drx-InactivityTimer: defines the length of a starting duration in which the UE is in an awoken state, after a PDCCH occasion in which a PDCCH indicating initial UL or DL data is detected.

Value of drx-HARQ-RTT-TimerDL: defines the length of a maximum time duration until DL retransmission is received, after DL initial transmission is received.

Value of drx-HARQ-RTT-TimerDL: defines the length of a maximum time duration until a grant for UL retransmission is received, after a grant for UL initial transmission is received.

drx-LongCycleStartOffset: defines a time length and a starting time point of a DRX cycle drx-ShortCycle (optional): defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awoken state.

Depending on UE implementation, each UE may consume a different amount of power in receiving a DL signal and processing the received DL signal by, for example, decoding. For example, a radio frequency (RF) circuit should operate to receive a DL signal, and a baseband circuit may operate for subsequent processing such as decoding.

A UE may perform various operations according to UE implementation and situations. For example, the UE may process another DL signal by, for example, detection or decoding simultaneously with receiving a specific DL signal. Further, the UE may process a specific DL signal without a DL signal reception operation. Further, the UE may operate circuits only for a minimal operation such as synchronization maintenance and/or memory maintenance, for subsequent DL signal reception and processing.

In each of the above-described UE operations, the power consumption of the UE may be different, and may be efficiently managed by enabling the UE to perform a suitable operation according to traffic and/or a UE state. In the present disclosure, a method of efficiently managing power consumption of a UE by enabling the UE to perform a suitable operation according to traffic and/or a UE state will be described.

For the convenience of description, a state in which a UE prepares for subsequent DL signal reception and processing is referred to as "micro sleep". That is, the present disclosure proposes a method of efficiently supporting micro sleep of a UE.

Figure 13:
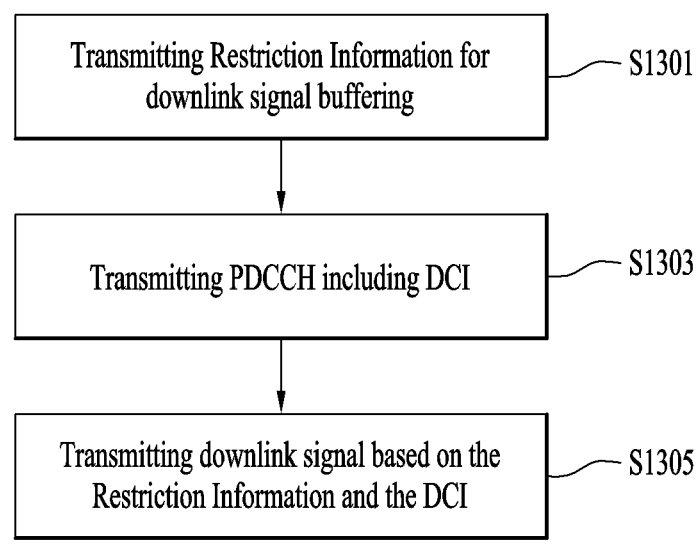
Figure 14:
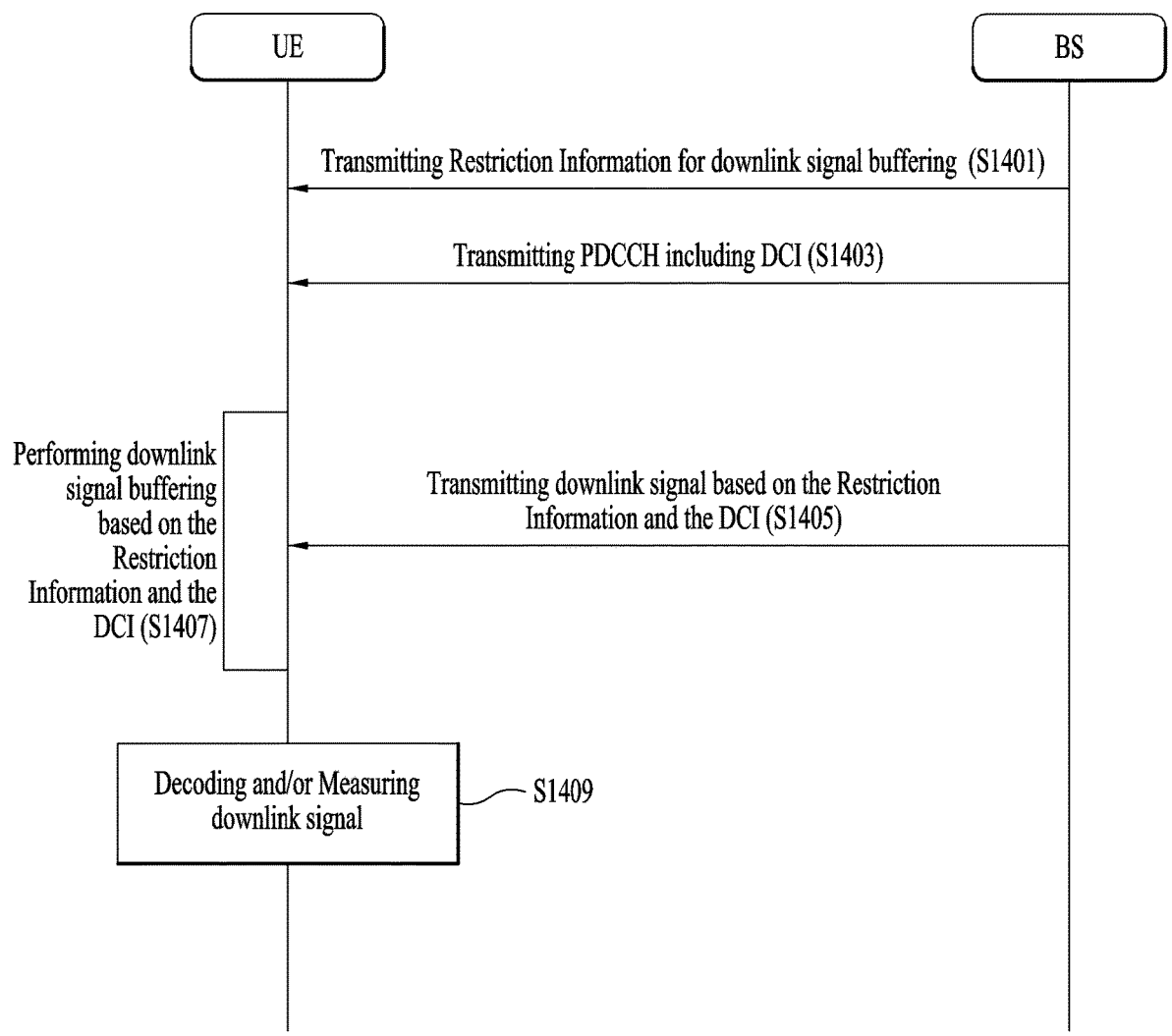

FIGS. 12, 13, and 14 illustrate exemplary operations of a UE, a BS, and a network according to embodiments of the present disclosure.

FIG. 12 illustrates an exemplary UE operation according to the present disclosure. Referring to FIG. 12, a UE may receive restriction information for determining whether to buffer a DL signal by higher-layer signaling and/or physical-layer signaling (S1201). The UE may receive a PDCCH including DCI (S1203). The DCI may include information for obtaining a slot offset K0, a start symbol S, and an allocation length L for a PDSCH time-domain resource assignment, and information for configuring aperiodic CSI-RS transmission and/or aperiodic CSI reporting. Specifically, the information included in the DCI may be based on Embodiment 1 and Embodiment 2 described below.

The UE may then determine whether to buffer a DL signal based on the received restriction information and the DCI, and may or may not buffer the DL signal (S1205). The UE may not receive the DL signal during a period in which the UE does not perform buffering. In other words, when it is said that the UE does not buffer a DL signal, this may mean that the UE does not receive the DL signal. For example, when the UE determines not to perform PDSCH buffering, the UE may not receive a PDSCH and hence, may not expect PDSCH transmission, during a period in which the UE does not perform PDSCH buffering. Further, a method of determining whether to perform buffering by a UE may be based on Embodiment 1 and Embodiment 2 described below.

Upon receipt of the DL signal, the UE may decode or measure the received DL signal (S1207). For example, when the DL signal is a PDSCH, the UE may decode the PDSCH, and when the DL signal is a CSI-RS, the UE may measure the CSI-RS.

The above-described operations of steps S1201 to S1207 may be based on Embodiment 1 and Embodiment 2 described below, and the UE performing the operations of steps S1201 to S1207 may be any of various devices illustrated in FIGS. 16, 17 and 18 described later.

FIG. 13 is a diagram illustrating an exemplary BS operation according to the present disclosure. Referring to FIG. 13, a BS may transmit restriction information for determining whether to perform DL signal buffering by higher-layer signaling and/or physical-layer signaling (S1301). The BS may transmit a PDCCH including DCI (S1303). The DCI may include information for obtaining a slot offset K0, a start symbol S, and an allocation length L for a PDSCH time-domain resource assignment, and information for configuring aperiodic CSI-RS transmission and/or aperiodic CSI reporting. Specifically, the information included in the DCI may be based on Embodiment 1 and Embodiment 2 described below. The BS may then transmit a DL signal based on the restriction information and the DCI (S1305). The BS may not transmit the DL signal during a period in which the BS determines that the UE does not buffer the DL signal based on Embodiment 1 and Embodiment 2 described later. In other words, when it is said that the UE does not buffer a DL signal, this may mean that the UE does not receive the DL signal. For example, when the BS expects the UE not to perform PDSCH buffering, the BS may not transmit the PDSCH during a period in which the UE is not expected to perform PDSCH buffering.

The above-described operations of steps S1301 to S1307 may be based on Embodiment 1 and Embodiment 2 described below, and the BS performing the operations of steps S1301 to S1307 may be any of various devices illustrated in FIGS. 16, 17 and 18.

FIG. 14 is a diagram illustrating an exemplary network operation according to an embodiment of the present disclosure. Referring to FIG. 14, a BS may transmit restriction information for determining whether to perform DL signal buffering to a UE by higher-layer signaling and/or physical-layer signaling (S1401). The BS may transmit a PDCCH including DCI to the UE (S1403). The DCI may include information for obtaining a slot offset K0, a start symbol S, and an allocation length L for a PDSCH time-domain resource assignment, and information for configuring aperiodic CSI-RS transmission and/or aperiodic CSI reporting. Specifically, the information included in the DCI may be based on Embodiment 1 and Embodiment 2 described below. The BS may then transmit a DL signal to the UE based on the restriction information and the DCI (S1405). The UE may determine whether to buffer the DL signal based on the received restriction information and DCI, and may or may not buffer the DL signal (S1407). The UE may not receive the DL signal during a period in which buffering is not performed. In other words, when it is said that the UE does not buffer a DL signal, this may mean that the UE does not receive the DL signal. For example, when the UE determines not to perform PDSCH buffering, the UE may not receive a PDSCH and hence, may not expect PDSCH transmission, during a period in which the UE does not perform PDSCH buffering. Further, a method of determining whether to perform buffering by a UE may be based on Embodiment 1 and Embodiment 2 described below.

The BS may not transmit the DL signal during a period in which the BS determines that the UE does not buffer the DL signal based on Embodiment 1 and Embodiment 2 described later. In other words, when it is said that the UE does not buffer a DL signal, this may mean that the UE does not receive the DL signal. For example, when the BS expects the UE not to perform PDSCH buffering, the BS may not transmit the PDSCH during a period in which the UE is not expected to perform PDSCH buffering.

Upon receipt of the DL signal, the UE may decode or measure the received DL signal (S1409). For example, when the DL signal is a PDSCH, the UE may decode the PDSCH, and when the DL signal is a CSI-RS, the UE may measure the CSI-RS.

In view of latency, the interval between the transmission timing of a PDCCH and the transmission timing of a PDSCH scheduled by the PDCCH may be small. For example, the PDSCH transmission may start in the symbol shortly following the ending symbol of the PDCCH transmission, or the PDCCH and PDSCH transmissions may start in the same symbol. After receiving the PDCCH, the UE may decode the received PDCCH, interpret DCI contents included in the PDCCH, and transmit the DCI contents to a higher layer.

The process such as decoding may require as much time as one or more symbols. When the PDSCH transmission starts before the process is completed, the UE may buffer the DL signal received during the process in progress. This operation is referred to as PDSCH buffering.

Similarly, a UL grant may indicate measurement in an aperiodic CSI-RS resource. When the transmission timing of a corresponding CSI-RS may be set before PDCCH processing is completed, the UE may buffer the DL signal. Accordingly, while embodiments of the present disclosure are described in the context of PDSCH buffering for the convenience of description, the present disclosure may also be extended to buffering of other DL signals such as a CSI-RS.

To receive a DL signal such as a PDSCH while processing a PDCCH, the UE should perform PDSCH buffering by storing the DL signal such as the PDSCH, before the DL signal is processed by means of a baseband circuit or the like, simultaneously with receiving the DL signal by operating an RF circuit. Herein, the DL signal may have been subjected to some processes.

In contrast, when it is guaranteed that the starting time of the DL signal such as the PDSCH is after the PDCCH is completely processed, the UE may control circuits in a suitable frequency range and transmission method according to DCI contents of the PDCCH without the need for PDSCH buffering. For example, the UE may at least turn off the RF circuits or operate the RF circuit with minimum power during the PDCCH processing. Therefore, the power consumption of the UE may be managed efficiently.

The power consumption efficiency of the UE may be increased by appropriately setting a value related to a time-domain resource assignment, such as a slot offset K0 and/or an SLIV for indicating a PDSCH start symbol and a PDSCH allocation length. K0 may be the difference between a slot carrying the PDCCH and a slot in which the PDSCH is transmitted or starts to be transmitted, and the SLIV may be a value indicating a start symbol index, an ending symbol index, and/or a PDSCH allocation length in a slot carrying the PDSCH.

For example, when K0 is set to 1 or larger or when K0 is 0 but the start symbol derived from the SLIV is a predetermined time (e.g., 5 symbols) after the ending symbol of the PDCCH transmission, the UE may not perform PDSCH buffering during PDCCH reception and processing. In other words, when K0 is set to 1 or larger, the UE may not perform PDSCH reception and buffering at least in a slot including the ending symbol of the PDCCH transmission.

Further, when K0 is 0 but the start symbol derived from the SLIV is symbol #5, the PDSCH reception and buffering may not be performed from the ending symbol of the PDCCH transmission to symbol #4 of a corresponding slot.

In the case where candidate values for a time-domain resource assignment are configured by RRC signalling and one of the candidate values is determined to be K0 and an SLIV for the time-domain resource assignment by DCI, when a PDSCH transmission time is restricted for every candidate value to secure a PDCCH processing time and reduce the power consumption of the UE, data throughout may be lost due to latency.

Accordingly, there is a need for flexibly controlling whether a UE is to perform PDSCH buffering. Therefore, specific examples of the method of flexibly controlling whether PDSCH buffering is to be performed according to the present disclosure will be described in Embodiment 1.

Each embodiment under Embodiment 1 may be implemented in combination of each embodiment under Embodiment 2. For example, it may be determined whether PDSCH buffering and CSI-RS buffering are to be performed by combining any of the embodiments under Embodiment 1 with any of the embodiments under Embodiment 2.

1. Embodiment 1

(1) Embodiment 1-1

When the BS transmits a PDSCH time-domain resource assignment table including candidate values for a time-domain resource assignment through the RRC, the UE may receive the PDSCH time-domain resource assignment table via the RRC.

The BS may indicate a limit for K0, an SLIV, and/or a start symbol index to the UE. For example, the BS may indicate a minimum value for K0 or a minimum value for the start symbol index in a slot. The start symbol index may be indicated directly or derived from the SLIV. Alternatively, a specific time may be indicated by a combination of K0 and the SLIV or a combination of K0 and the start symbol index. In other words, the UE may receive information related to the limit of K0, the SLIV, and/or the start symbol index, and the limit may be a minimum value of K0, a minimum value of the start symbol index in a slot, or a combination of both.

The UE may not perform PDSCH buffering before the time limit indicated by the BS. For example, the UE may not expect a PDSCH transmission that starts before the time point indicated by the BS. Further, the BS may not transmit the PDSCH before the time limit indicated to the UE.

For example, if the minimum value of K0 is indicated, the UE may not receive the PDSCH, expecting that the PDSCH will not be transmitted from the reception time of a PDCCH until a slot corresponding to the minimum value of K0. That is, the UE may receive the PDSCH in a time resource after the reception time of the PDCCH to the slot corresponding to the minimum value of K0. For example, the UE may expect that the PDSCH is scheduled by the received PDCCH based on a time-domain resource assignment candidate value including a K0 value equal to or greater than the indicated minimum K0 value among the candidate values for the time-domain resource assignment, and receive the PDSCH accordingly. Further, DCI included in the PDCCH transmitted by the BS will include PDSCH scheduling information based on the time-domain resource assignment candidate value including a K0 value equal to or greater than the minimum K0 value. In other words, when the BS indicates the minimum value of K0, the BS does not schedule the PDSCH from the transmission time of the PDCCH until up to a slot corresponding to the minimum value of K0, and may transmit the PDSCH in a time resource after the slot corresponding to the minimum value of K0.

In an exceptional case of Embodiment 1-1, however, the UE may perform PDSCH buffering according to a time-domain resource assignment configuration irrespective of restriction information at a time for receiving system information, a random access response (RAR), and/or paging DCI (e.g., in a PDCCH monitoring occasion in which the DCI is expected to be received). In other words, the UE may receive the PDSCH according to the time-domain resource assignment configuration irrespective of the restriction information at the time for receiving the system information, the RAR, and/or the paging DCI. That is, the BS may transmit the PDSCH according to the time-domain resource assignment configuration irrespective of the pre-indicated restriction information at a time for transmitting the system information, the RAR, and/or the paging DCI.

For example, when monitoring a PDCCH within a system information (SI) window, when recognizing an SI change in paging DCI, when transmitting a PRACH and monitoring a PDCCH to receive an RAR within an RAR window, and/or in a paging occasion, the UE may ignore restriction information for PDSCH buffering. In other words, when the UE expects or determines that DCI has been scrambled with an SI-RNTI, an RA-RNTI, a TC-RNTI, or a P-RNTI in a PDCCH, the UE may ignore the restriction information for PDSCH buffering. That is, when the UE expects or determines that the DCI has been scrambled with the SI-RNTI, the RA-RNTI, the TC-RNTI, or the P-RNTI in the PDCCH, the UE may expect to receive a PDSCH without applying the restriction information for PDSCH buffering. Further, when the BS scrambles the DCI with the SI-RNTI, the RA-RNTI, the TC-RNTI, or the P-RNTI in the PDCCH, the BS may transmit the PDSCH without applying the restriction information for PDSCH buffering. The DCI scrambled with the SI-RNTI, the RA-RNTI, the TC-RNTI, or the P-RNTI may be transmitted in a Type 0/Type 0A/Type 1/Type 2 common search space (CSS).

When UL grant DCI may trigger aperiodic CSI reporting, the UE may not receive resources for CM and/or IM during a time period configured by a limited K0, SLIV, and/or start symbol index. For example, the UE may not receive a CSI-RS for CM and/or IM, a CSI-IM for CM and/or IM, or an SSB during a time period from a PDCCH transmission time to a time when a PDSCH configured by a limited K0, SLIV, and/or start symbol index may start.

In another example, resources for CM and/or IM may not be transmitted by the BS, and the UE may not receive the resources for CM and/or IM irrespective of whether the BS has transmitted the resources for CM and/or IM. In other words, it may be assumed that a limit for an aperiodic CSI-RS triggering offset is equal to a limit for K0, an SLIV, and/or a start symbol index. For example, when the minimum value of K0 is indicated, the K0 value may be regarded as the minimum value of the aperiodic CSI-RS triggering offset.

(2) Embodiment 1-2

The BS may indicate a restricted set for a PDSCH time-domain resource assignment to the UE. In other words, a restricted set actually available from a table configured for the time-domain resource assignment by RRC signalling or by default may be indicated.

Each row in the table configured for the time-domain resource assignment may include K0, an SLIV, and/or a PDSCH mapping type, and the restricted set may be configured to be a set of some of the rows of the table. For the restricted set, the BS may provide a threshold for a row index to the UE, and the UE may assume that row indexes equal to or larger than the threshold, equal to or less than the threshold, larger than the threshold, or less than the threshold are included in the restricted set. Further, the UE may expect that a PDSCH is transmitted only based on the restricted set.

For example, it may be determined whether to perform PDSCH buffering based on the minimum of the starting timing of the PDSCH transmission (e.g., the PDSCH start symbol indexes), among the candidate values of the restricted set, for the time-domain resource assignment.

For example, when K0 is 1 and the start symbol index derived from the SLIV or directly indicated is 4 from the candidate value of the restricted set, for the time-domain resource assignment, the UE may not perform PDSCH buffering during a time period from the ending symbol of the PDCCH until before symbol #4 of the slot next to a slot including the ending symbol of the PDCCH. Further, the UE may not expect the PDSCH transmission at a time corresponding to a row which is not included in the indicated restricted set among the rows of the table for the time-domain resource assignment.

When UL grant DCI may trigger aperiodic CSI reporting, the UE may not receive resources for CM and/or IM during a time period configured by a limited K0, SLIV, and/or start symbol index. For example, the UE may not receive a CSI-RS for CM and/or IM, a CSI-IM for CM and/or IM, or an SSB during a time period from a PDCCH transmission time to a time when a PDSCH configured by the limited K0, SLIV, and/or start symbol index may start.

In another example, resources for CM and/or IM may not be transmitted by the BS, and the UE may not receive the resources for CM and/or IM irrespective of whether the BS has transmitted the resources for CM and/or IM. In other words, it may be assumed that a limit for an aperiodic CSI-RS triggering offset is equal to a limit for the restricted set for the PDSCH time-domain resource assignment.

(3) Embodiment 1-3

The BS may indicate to the UE whether to perform PDSCH buffering. When the UE is configured with non-PDSCH buffering, the UE may not perform PDSCH buffering from the ending symbol of a PDCCH transmission.

For example, a time period during which the UE skips PDSCH buffering may be a slot carrying the PDCCH. Further, the UE may skip PDSCH buffering at least during a time period configured for the UE by higher-layer signalling from the BS. The time period during which the UE skips PDSCH buffering may be configured by a higher-layer parameter "Threshold-Sched-Offset".

In this case, PDSCH processing may be performed only after PDCCH processing such as PDCCH decoding and/or DCI contents interpretation. Further, the UE may not expect a PDSCH transmission corresponding to a row requiring PDSCH buffering among the rows of the time-domain resource assignment table. Further, the UE may not perform data buffering for receiving another DL signal such as a CSI-RS or an SSB during a time period in which PDSCH buffering is not performed or during a time period separately configured by the BS.

In Embodiment 1, in a situation in which the UE does not perform PDSCH buffering before a specific time based on restriction information indicated by the BS, the BS may start a PDSCH transmission before the specific time. Then, (1) the UE may not perform decoding and/or channel estimation on a corresponding PDSCH, or (2) the UE may perform decoding and/or channel estimation for the remaining code blocks (CBs) without performing decoding and/or channel estimation for a CB corresponding to a time before the specific time. It may be determined whether to perform decoding and/or channel estimation for the CB, according to the presence or absence of an additional DMRS or the presence or absence of a DMRS after the specific time.

Further, the UE may skip HARQ-ACK transmission for the PDSCH transmitted by the BS. However, this may be limited to TB-based HARQ-ACK transmission. In the case of CBG-based HARQ-ACK transmission, the UE may skip HARQ-ACK transmission only for a CBG including CBs for which decoding and/or channel estimation has been skipped. Skipping HARQ-ACK transmission may imply that the UE does not transmit an HARQ-ACK or processes the feedback as NACK. When slot aggregation is configured, a single TB may be transmitted across a plurality of slots. In this case, when the UE does not perform PDSCH buffering before a specific time, the UE may receive a PDSCH transmitted in a slot including the specific time or a region other than a region before the specific time, and may not skip HARQ-ACK transmission. In other words, the PDSCH may be received in the slot including the specific time, and in a slot after the specific time or a region after the specific time in aggregated slots.

Whether to perform data buffering for a CSI-RS, a CSI-IM, and/or an SSB may be determined in a different manner from a determination as to whether to perform PDSCH buffering. Therefore, a description will be given of determination as to whether to perform data buffering for a CSI-RS, a CSI-IM, and/or an SSB in Embodiment 2.

While for the convenience of description, each embodiment under Embodiment 2 is described in the context of CSI-RS, the same thing may apply to CSI-IM and/or SSB. Further, Embodiment 2 may be implemented in combination with Embodiment 1, as described before. For example, it may be determined whether to perform PDSCH buffering or whether to perform buffering for a CSI-RS by combining any embodiment of Embodiment 1 with any embodiment of Embodiment 2.

2. Embodiment 2

(1) Embodiment 2-1

The BS may restrict aperiodic CSI triggering state values available to the UE. For example, the use of a non-zero CSI triggering state may be restricted during a specific time period. For example, CSI reporting may be restricted during the specific time period.

When the BS restricts an aperiodic CSI triggering state, the UE may not receive a measurement resource during a specific time period. For example, the UE may not receive a measurement resource during a time period configured for the UE by the BS or a time period from the ending symbol of a PDCCH to the first symbol of a slot carrying a PUSCH or the first symbol of a PUSCH transmission. This restriction information may be provided to the UE by L1 signaling or higher-layer signalling from the BS.

(2) Embodiment 2-2

The BS may configure the UE to ignore a CSI triggering state or not to update CSI. The configuration may be determined according to a PUSCH state such as multiplexing or non-multiplexing of TBs and/or HARQ-ACKs, and the number of CSI reports.

For example, when there is neither a TB nor an HARQ-ACK in a PUSCH and one CSI report is scheduled, the UE may not transmit the PUSCH. Otherwise, the UE may transmit the PUSCH without updating a CSI report.

When the BS configures the UE to ignore a CSI triggering state or not to update CSI, the UE may not receive a measurement resource during a specific time period. For example, the UE may not receive a measurement resource during a time period configured for the UE by the BS or a time period from the ending symbol of a PDCCH to the first symbol of a slot carrying a PUSCH or the first symbol of a PUSCH transmission. This restriction information may be provided to the UE by L1 signaling or higher-layer signaling from the BS.

(3) Embodiment 2-3

When aperiodic CSI-RS transmission is triggered for measurement resources such as an NZP-CSI-RS and/or a CSI-IM by DCI triggering aperiodic CSI reporting, the BS may indicate a value indicating a transmission position which may be represented in slots to the UE by L1 signaling or higher-layer signaling. The value indicating the transmission position may be represented as an aperiodic triggering offset. For example, even though a triggering offset for a specific aperiodic CSI triggering state is set to 3 slots, a larger value such as 14 slots may be configured by an indication from the BS.

For aperiodic CSI reporting, a periodic/semi-persistent CSI-RS, CSI-IM resource, or SSB may be measured. In this case, the UE may not expect to receive a periodic/semi-persistent measurement resource in a time period in which an aperiodic CSI-RS is not transmittable.

A CSI report corresponding to a measurement resource of which the reception is not expected (1) may not be updated or (2) may be updated based on a value calculated in measurement resources other than the measurement resource. When it is configured that a measurement is performed only in the latest received measurement resource, the measurement may be performed by considering a valid resource before the corresponding resource to be the latest received measurement resource.

Restriction information that the BS provides to the UE to support micro sleep according to Embodiment 1 and Embodiment 2 and a procedure based on the restriction information may be implemented when PDCCH monitoring occasions start in a start symbol of a slot. However, when a PDCCH monitoring occasion is located in the middle or at the end of a slot according to a search space configuration, the transmission time of a PDCCH that schedules a PDSCH or PDCCH monitoring occasions may be considered additionally in determining whether to perform PDSCH buffering.

For example, K0 and/or an SLIV on which a limit is imposed for PDSCH buffering may be configured to be different or independent in each PDCCH monitoring occasion. Alternatively, an additional offset may be applied together with the restriction information according to a PDCCH monitoring occasion. For example, the restriction information may be represented as the index of a symbol in which the PDCCH monitoring occasion starts in a slot.

Further, restriction information that the BS provides to the UE to support micro sleep according to Embodiment 1 and Embodiment 2 and a procedure based on the restriction information may be confined to a specific CORESET, search space, RNTI, and/or scheduling carrier. Further, the BS may configure restriction information for the UE, for each CORESET, search space, RNTI, and/or scheduling carrier.

For example, only scheduling in the same slot may be supported for a CSS. In this case, when the UE skips PDSCH buffering, the UE may not receive a broadcast message.

However, because a broadcast message is a message providing essential information required for the UE to perform a wireless communication operation with a cell, such as SI, in many cases, failure in receiving the broadcast message is highly likely to cause an error in a basic wireless communication operation of the UE.

Therefore, the UE may perform PDSCH buffering at least in a CSS according to a PDSCH time-domain resource assignment configuration irrespective of PDSCH buffering restriction information. In other words, the UE may receive a PDSCH irrespective of the PDSCH buffering restriction information.

However, when a CSS is configured in each slot, PDSCH buffering may not be skipped in some cases. Accordingly, the UE may perform PDSCH buffering at a time for receiving SI, an RAR, and/or paging DCI (e.g., in a PDCCH monitoring occasion in which the DCI is expected to be received) according to the PDSCH time-domain resource assignment configuration irrespective of the restriction information. In other words, the UE may receive the PDSCH at the time for receiving the SI, the RAR, and/or the paging DCI according to the PDSCH time-domain resource assignment configuration irrespective of the restriction information.

For example, when monitoring a PDCCH within an SI window, when recognizing an SI change in paging DCI, when transmitting a PRACH and monitoring a PDCCH to receive an RAR within an RAR window, and/or in a paging occasion, the UE may ignore restriction information for PDSCH buffering. In other words, when the UE expects or determines that DCI has been scrambled with an SI-RNTI, an RA-RNTI, a TC-RNTI, or a P-RNTI in a PDCCH, the UE may ignore restriction information for PDSCH buffering. That is, when the UE expects or determines that the DCI has been scrambled with the SI-RNTI, the RA-RNTI, the TC-RNTI, or the P-RNTI in the PDCCH, the UE may expect to receive a PDSCH without applying the restriction information for PDSCH buffering. The DCI scrambled with the SI-RNTI, the RA-RNTI, the TC-RNTI, or the P-RNTI may be transmitted in a Type 0/Type 0A/Type 1/Type 2 CSS.

Additionally or independently, PDSCH buffering restriction information may be ignored in CORESET #0 and/or a CSS even at a time when DCI for a C-RNTI, a CS-RNTI, or an MCS-C-RNTI is transmitted. Even for DCI scrambled with a C-RNTI, the PDSCH time-domain resource assignment configuration may be identical to that of another broadcast message. In this case, only the same-slot scheduling is supported. Therefore, only when the same case in which restriction information does not restrict broadcast message reception is applied, UE complexity may not be increased.

Depending on UE implementation, each UE may have a different PDCCH processing time. Accordingly, when PDSCH buffering restriction information is configured for a UE, information about the UE may be required. For example, the UE may report a time taken for PDCCH processing (e.g., in symbols or msec) to the BS, for each numerology, SCS, or number of blind decodings/CCEs and/or based on a maximum number of blind decodings/CCEs.

Further, the UE may report, from PDCCH which is based on a start symbol index related to K0 and/or an SLIV included in restriction information configured by the BS, a minimum value for the starting time of a PDSCH corresponding to the PDCCH. Further, the UE may report its preferred candidate value list or a specific candidate value in a PDSCH time-domain resource assignment table to the BS. The specific candidate value may correspond to the minimum value of the starting time of the PDSCH corresponding to the PDCCH.

Further, the UE may report whether to perform PDSCH buffering or data buffering to the BS according to a specific time period or a specific condition. For example, the specific time period may include a timing at which the UE transmits the above-described report message to the BS. Further, the specific condition may be, for example, a time period from a predetermined time after reception of DCI/PDCCH for DL and/or UL scheduling to a reception time of DCI/PDCCH for new DL and/or UL scheduling. The above-described specific time may be determined by the UE and reported to the BS, or may be configured for the UE by the BS.

The BS may restrict PDSCH scheduling based on the report information received from the UE, or provide the above-described PDSCH scheduling restriction information (e.g., K0 and/or an SLIV) again to the UE. When PDSCH scheduling is restricted only based on the report of the UE, the UE and the BS may apply the report of the UE a predetermined time after the transmission time of the report information of the UE.

In Embodiment 1 and Embodiment 2, the BS may transmit, to the UE, restriction information indicating whether PDSCH buffering is performed or restriction information for a PDSCH time-domain resource assignment which may be used for the restriction information, as follows.

(1) The restriction information may be indicated in a MAC message, and the UE may apply the restriction information a specific time (e.g., several micro seconds) after the transmission or reception time of the MAC message.

(2) The restriction information may be indicated by DCI, and the UE may apply the restriction information until before the next DCI transmission time, according to a PDCCH periodicity with which the DCI is transmitted.

(3) In conjunction with a DRX operation, the UE may assume a different PDSCH time-domain resource assignment or a different determination as to whether to perform PDSCH buffering, for each time interval within an active time of the DRX operation. For example, the UE may apply a restriction configuration for PDSCH buffering or a restriction configuration for a time-domain resource assignment at the start of a DRX cycle, that is, when a drxonDuration timer starts, while expecting a PDSCH transmission corresponding to every candidate value of a pre-configured PDSCH time-domain resource assignment without restriction, in other times.

Further, in another method of the DRX-linked scheme, the restriction information may be represented independently of a DRX operation. For example, the UE may perform a restriction operation for data buffering in every first period. Upon successful reception of a PDCCH, the UE may perform data buffering without restriction during a specific time period, and each time the UE successfully receives a PDCCH, the specific time period may be lengthened. The PDCCH may be confined to a PDCCH corresponding to new data, and the specific time period may be a time period configured for the UE by the BS.

In the scheme of (3), considering that there will not be a PDCCH/PDSCH during a time period in which the timer drx-onDurationTimer is running (hereinafter, referred to as an On duration period), PDSCH buffering may be skipped to secure a maximum micro sleep period, while PDSCH buffering may be performed according to a PDSCH time-domain resource assignment configuration corresponding to the operation of drx-onDurationTimer after the PDCCH and/or the PDSCH is actually received during the On duration. Otherwise, the interval between the PDCCH and PDSCH transmissions may be set to be small during the operation of drx-onDurationTimer.

After actually receiving the PDCCH and/or the PDSCH, the UE may perform PDSCH buffering. Further, the PDSCH buffering may be performed until before expiration of the timer drx-onDurationTimer, during the remaining DRX active time after PDCCH and/or PDSCH reception in a DRX active time corresponding to the actual reception time of the PDCCH and/or the PDSCH, or based on a third timer.

When the UE operates based on the third timer, the UE may start the third timer after actually receiving the PDCCH and/or the PDSCH. When a threshold configured by higher-layer signaling and/or physical-layer signal from the BS is reached and thus the third timer expires, the UE may skip PDSCH buffering again. The third timer may restart, when a PDCCH and/or a PDSCH is received. When a PDCCH and/or a PDSCH is not received, the timer value of the third timer may be incremented.

(4) It may be configured whether to perform PDSCH buffering or data buffering, on a BWP basis. For example, the BS may configure whether PDSCH buffering is to be performed, for each BWP, or the UE may not expect PDSCH buffering implicitly in a default BWP.

(5) The UE may determine whether to perform PDSCH buffering. In this case, a UE requirement needs to be relaxed. For example, when the difference between the transmission position of a current received PDCCH and the transmission position of the latest received PDCCH before the current PDCCH is equal to or larger than a predetermined value, the UE may skip PDSCH buffering, and otherwise, the UE may perform PDSCH buffering.

For example, when the difference between the last symbol of a latest received PDCCH and the start symbol or slot of a current PDCCH to be monitored, the UE may skip PDSCH buffering, and otherwise, the UE may expect PDSCH buffering. The predetermined value may be different according to a UE capability. When the UE reports its capability to the BS, the BS may configure whether PDSCH buffering is to be performed for the UE based on the report.

Two PDCCHs that determine the difference between start symbols/slots, for determining whether PDSCH buffering is to be performed, may be implemented separately for DL scheduling and UL scheduling, or in combination irrespective of DL/UL. Further, the UE may neither perform nor expect PDSCH buffering for M ones of N PDCCH receptions.

Further, when PDSCH buffering is limited or is not performed, the UE may additionally reduce the number of PDCCH blind detection attempts. This operation is intended to secure a time for the micro sleep state of the UE by reducing a PDCCH processing time. For this purpose, the UE may or may not perform PDCCH monitoring for some CORESET, search space, AL, CCE set, and/or DCI format.

Signaling, a condition, and/or a method which restricts PDSCH buffering as described in the present disclosure may be extended to other transmission and reception schemes of a UE. For example, the BS may provide restriction information for the number of PDSCH transmission layers and/or a supported RS port combination to the UE, and the UE may not expect PDSCH transmission for the other configurations based on the restriction information, thereby saving power. Herein, an RS port may refer to a port for DMRS transmission.

For example, the BS may provide the UE with information that restricts values of a specific field (e.g., an antenna port field) of DCI to a certain subset or information that limits available DMRS ports, and the UE may turn off some DMRS ports during PDSCH reception based on the restriction information, thereby saving power. The restriction information may be provided by higher-layer signaling such as a MAC message or L1 signaling such as DCI.

Further, a time when the restriction information is applied may be determined a specific time after the transmission time of the restriction information and/or in conjunction with a DRX operation. For example, the restriction information may be applied only to a time period during which the timer drx-onDurationTimer is running.

The various descriptions, functions, procedures, proposals, methods, and/or operational flowcharts of the present invention described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
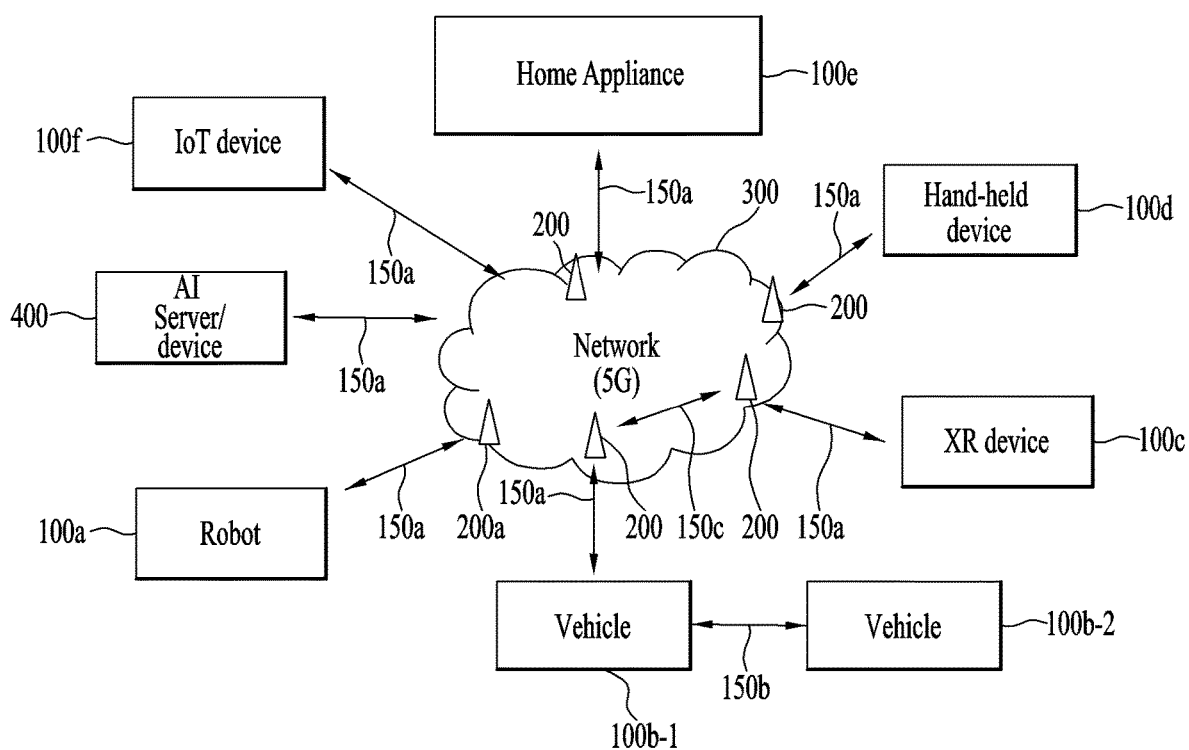
FIG. 15 is a diagram illustrating an exemplary wireless communication environment to which embodiments of the present disclosure are applicable.

FIG. 15 illustrates a communication system 1 applied to the present invention

Referring to FIG. 15, a communication system 1 applied to the present invention includes wireless devices, BSs, and a network. Herein, the wireless devices represent devices performing communication using radio access technology (RAT) (e.g., 5G new RAT (NR)) or long-term evolution (LTE)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Figure 16:
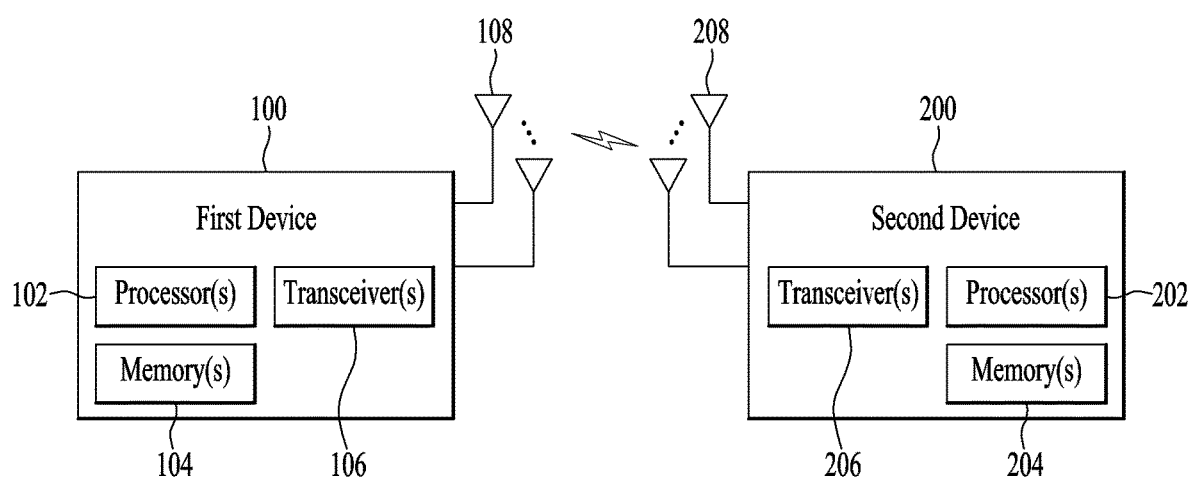
FIGS. 16, 17 and 18 are diagrams illustrating exemplary various wireless devices to which embodiments of the present disclosure are applicable.

FIG. 16 illustrates wireless devices applicable to the present invention.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

Specifically, commands and/or operations controlled by the processor 102 and stored in the memory 104 in the wireless device 100 according to an embodiment of the present disclosure will be described below.

While the operations are described in the context of a control operation of the processor 102 from the perspective of the processor 102, software code for performing these operations may be stored in the memory 104.

The processor 102 may control the transceiver 106 to receive restriction information based on which it is determined whether to buffer a DL signal by higher-layer signaling and/or physical-layer signaling. The processor 102 may control the transceiver 106 to receive a PDCCH including DCI. The DCI may include information for obtaining a slot offset K0, a start symbol S, and an allocation length L for a PDSCH time-domain resource assignment, and may include information for configuring an aperiodic CSI-RS transmission and/or aperiodic CSI reporting. Specifically, information included in the DCI may be based on the afore-described Embodiment 1 and Embodiment 2.

The processor 102 may then determine whether the DL signal is to be buffered based on the received restriction information and DCI, and may or may not perform buffering according to the determination. The processor 102 may control the transceiver 106 not to receive a DL signal during a time period in which buffering is not performed. Further, a method of determining whether to perform buffering by the processor 102 may be based on the afore-described Embodiment 1 and Embodiment 2.

Upon receipt of the DL signal, the processor 102 may decode or measure the received DL signal. For example, when the DL signal is a PDSCH, the processor 102 may decode the PDSCH. When the DL signal is a CSI-RS, the processor 102 may measure the CSI-RS. The operation of the processor 102 may be based on the afore-described Embodiment 1 and Embodiment 2.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Specifically, commands and/or operations controlled by the processor 202 and stored in the memory 204 in the second wireless device 200 according to an embodiment of the present disclosure will be described below.

While the operations are described in the context of a control operation of the processor 202 from the perspective of the processor 202, software code for performing these operations may be stored in the memory 204.

The processor 202 may control the transceiver 206 to transmit restriction information based on which it is determined whether to buffer a DL signal by higher-layer signaling and/or physical-layer signaling. The processor 202 may control the transceiver 206 to transmit a PDCCH including DCI. The DCI may include information for obtaining a slot offset K0, a start symbol S, and an allocation length L for a PDSCH time-domain resource assignment, and may include information for configuring an aperiodic CSI-RS transmission and/or aperiodic CSI reporting. Specifically, information included in the DCI may be based on the aforedescribed Embodiment 1 and Embodiment 2. The processor 202 may then control the transceiver 206 to transmit a DL signal based on the restriction information and DCI. The processor 202 may control the transceiver 206 not to transmit a DL signal during a time period in which the first wireless device 100 does not buffer the DL signal. The operation of the processor 202 may be based on the aforedescribed Embodiment 1 and Embodiment 2.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
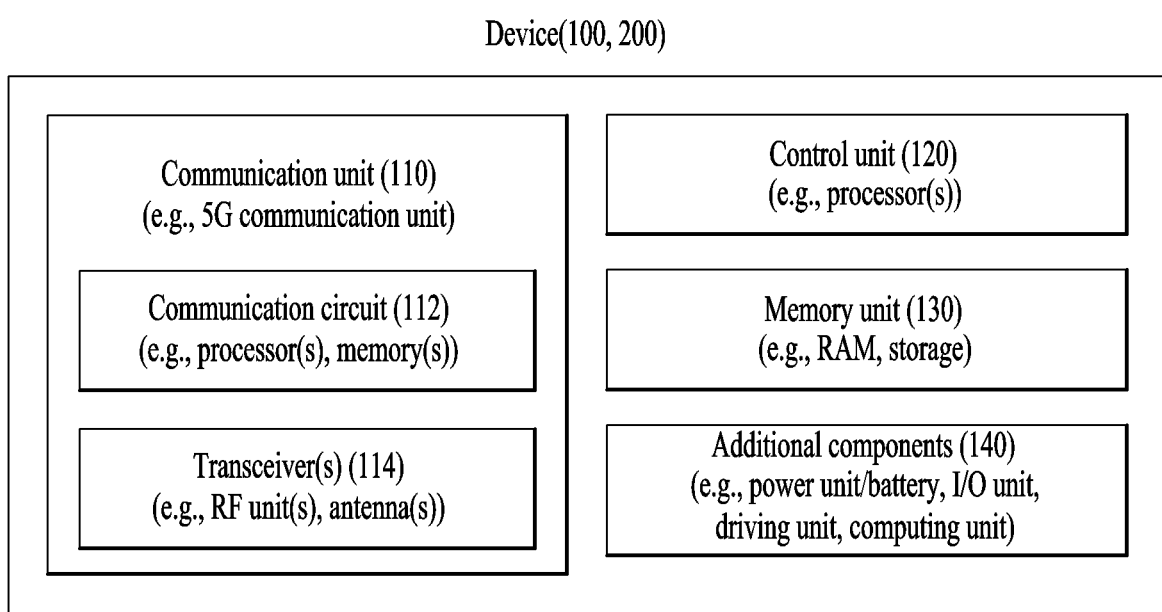

FIG. 17 illustrates another example of a wireless device applied to the present invention. The wireless device may be implemented in various forms according to a use-case/service (refer to FIG. 15)

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
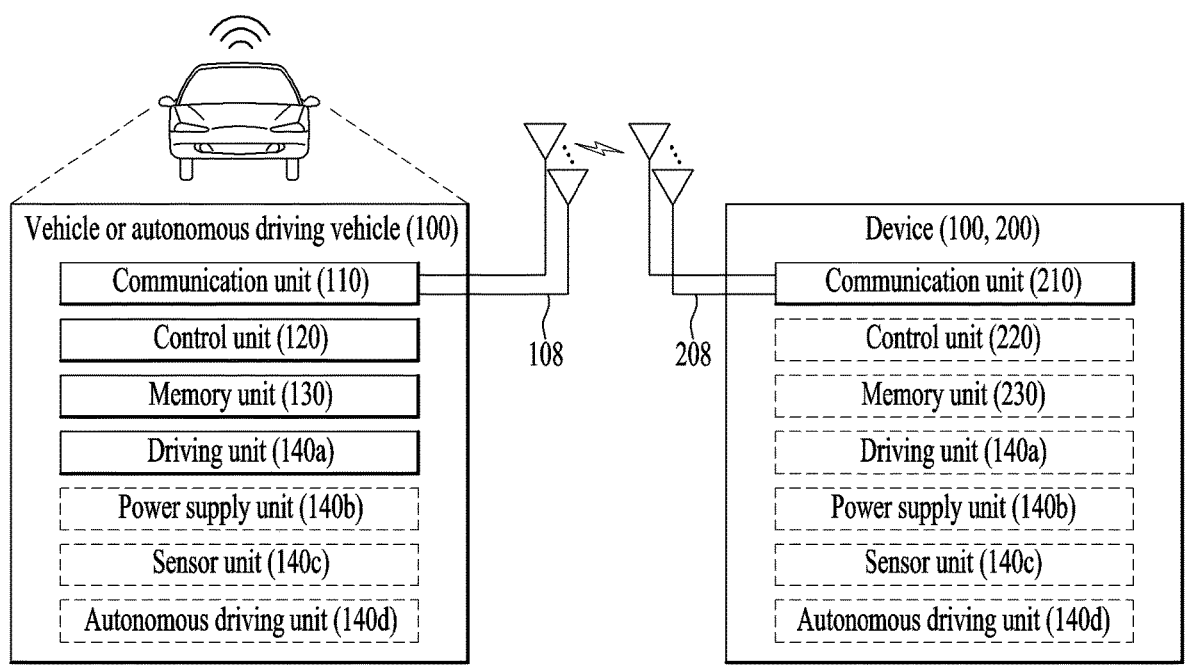

FIG. 18 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 19:
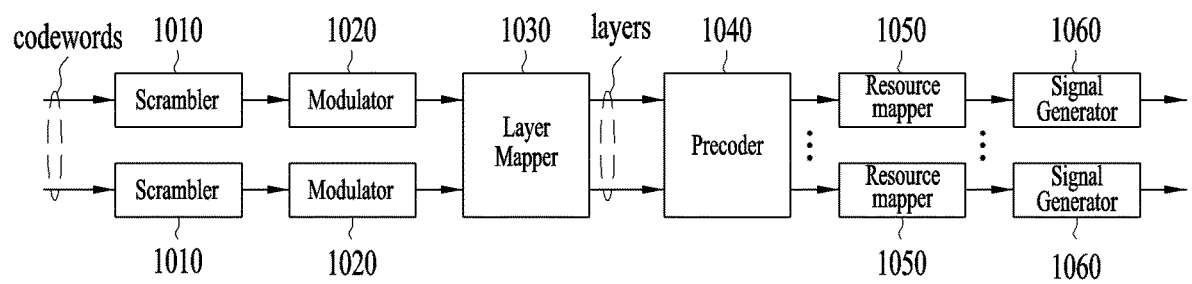
FIG. 19 is a block diagram illustrating an exemplary signal processing circuit to which embodiments of the present disclosure are applied.

FIG. 19 illustrates a signal process circuit for a transmission signal.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 16. Hardware elements of FIG. 19 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 16) may receive radio signals from the exterior through the antenna ports/transceivers. The received radio signals may be converted into baseband signals through signal restorers.

To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a terminal in a network including a plurality of network nodes including a base station can be performed by the base station or by a network node other than the base station. A base station may be replaced by terms such as a fixed station, a Node B, an eNode B (eNB), an access point, and the like.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

While the above-described method and apparatus for decoding a DL control channel have been described in the context of a 5G NewRAT system, the method and apparatus are also applicable to various other wireless communication systems.

What is claimed is:

1. A method of receiving a physical downlink shared channel (PDSCH) by a user equipment (UE) in a wireless communication system, the method comprising:

receiving, via a radio resource control (RRC) signaling, configuration information related to a plurality of PDSCH time-domain resource assignment candidates, wherein each of the plurality of PDSCH time-domain resource assignment candidates includes information about a minimum offset value for an interval between (i) a slot in which downlink control information (DCI) is received and (ii) a slot to which a PDSCH is allocated;

receiving the DCI for scheduling the PDSCH, wherein the DCI includes information for determining one among the plurality of PDSCH time-domain resource assignment candidates; and receiving the PDSCH based on a minimum offset value of a PDSCH time-domain resource assignment candidate determined by the DCI, wherein, based on the DCI for scheduling of the PDSCH related to system information (SI) or a random access response (RAR), the PDSCH is received without applying of the minimum offset value of the determined PDSCH time-domain resource assignment candidate.

2. The method according to claim 1, wherein, based on the PDSCH related to the SI or the RAR, the PDSCH is receivable based on an offset value less than the minimum offset value of the determined PDSCH time-domain resource assignment candidate.

3. The method according to claim 1, wherein no other downlink signal than the PDSCH is received from a first slot in which the DCI is received to a second slot determined based on the minimum offset value of the determined PDSCH time-domain resource assignment candidate.

4. The method according to claim 1, wherein the UE is communicable with at least one of another UE, a network, a base station (BS), or an autonomous driving vehicle.

5. An apparatus for receiving a physical downlink shared channel (PDSCH) in a wireless communication system, the apparatus comprising:

at least one processor; and at least one memory operatively coupled to the at least one processor, and storing instructions which, when executed, cause the at least one processor to perform a predetermined operation, wherein the predetermined operation comprises:

receiving, via a radio resource control (RRC) signaling, configuration information related to a plurality of PDSCH time-domain resource assignment candidates, wherein each of the plurality of PDSCH time-domain resource assignment candidates includes information about a minimum offset value for an interval between (i) a slot in which downlink control information (DCI) is received and (ii) a slot to which a PDSCH is allocated;

receiving the DCI for scheduling the PDSCH, wherein the DCI includes information for determining one among the plurality of PDSCH time-domain resource assignment candidates; and receiving the PDSCH based on a minimum offset value of a PDSCH time-domain resource assignment candidate determined by the DCI, and wherein, based on the DCI for scheduling of the PDSCH related to system information (SI), a random access response (RAR), the PDSCH is received without applying of the minimum offset value of the determined PDSCH time-domain resource assignment candidate.

6. The apparatus according to claim 5, wherein, based on the PDSCH related to the SI, the RAR, the PDSCH is receivable based on an offset value less than the minimum offset value of the determined PDSCH time-domain resource assignment candidate.

7. The apparatus according to claim 5, wherein no other downlink signal than the PDSCH is received from a first slot in which the DCI is received to a second slot determined based on the minimum offset value of the determined PDSCH time-domain resource assignment candidate.

8. The apparatus according to claim 5, wherein the apparatus is communicable with at least one of a user equipment (UE), a network, a base station (BS), or an autonomous driving vehicle.

9. A user equipment (UE) for receiving a physical downlink shared channel (PDSCH) in a wireless communication system, the UE comprising:

at least one transceiver;

at least one processor; and at least one memory operatively coupled to the at least one processor, and storing instructions which, when executed, cause the at least one processor to perform a predetermined operation, wherein the predetermined operation comprises:

receiving, via a radio resource control (RRC) signaling, configuration information related to a plurality of PDSCH time-domain resource assignment candidates, wherein each of the plurality of PDSCH time-domain resource assignment candidates includes information about a minimum offset value for an interval between (i) a slot in which downlink control information (DCI) is received and (ii) a slot to which a PDSCH is allocated;

receiving, through the at least one transceiver, the DCI for scheduling the PDSCH, wherein the DCI includes information for determining one among the plurality of PDSCH time-domain resource assignment candidates; and receiving, through the at least one transceiver, the PDSCH based on a minimum offset value of a PDSCH time-domain resource assignment candidate determined by the DCI, and wherein, based on the DCI for scheduling of the PDSCH related to system information (SI), a random access response (RAR), the PDSCH is received without applying of the minimum offset value of the determined PDSCH time-domain resource assignment candidate.

* * * * *